US008898058B2

(12) United States Patent
Shin et al.

(10) Patent No.: US 8,898,058 B2
(45) Date of Patent: Nov. 25, 2014

(54) SYSTEMS, METHODS, AND APPARATUS FOR VOICE ACTIVITY DETECTION

(75) Inventors: Jongwon Shin, San Diego, CA (US); Erik Visser, San Diego, CA (US); Ian Ernan Liu, Baldwin Park, CA (US)

(73) Assignee: QUALCOMM Incorporated, San Diego, CA (US)

( * ) Notice: Subject to any disclaimer, the term of this patent is extended or adjusted under 35 U.S.C. 154(b) by 547 days.

(21) Appl. No.: 13/280,192

(22) Filed: Oct. 24, 2011

(65) Prior Publication Data

US 2012/0130713 A1 May 24, 2012

Related U.S. Application Data

(63) Continuation-in-part of application No. 13/092,502, filed on Apr. 22, 2011.

(60) Provisional application No. 61/406,382, filed on Oct. 25, 2010.

(51) Int. Cl.

| | |
|---|---|
| ***G10L 11/06*** | (2006.01) |
| ***G10L 15/20*** | (2006.01) |
| ***G10L 19/14*** | (2006.01) |
| ***G10L 21/02*** | (2013.01) |
| ***G10L 15/04*** | (2013.01) |
| ***G10L 15/00*** | (2013.01) |
| ***G10L 19/12*** | (2013.01) |
| ***G10L 25/78*** | (2013.01) |

(52) U.S. Cl.

CPC ...................................... *G10L 25/78* (2013.01)
USPC ........... 704/208; 704/233; 704/205; 704/225; 704/226; 704/254; 704/240; 704/231; 704/221; 704/214

(58) Field of Classification Search

USPC ......... 704/208, 233, 205, 225, 226, 254, 240, 704/231, 221, 214
See application file for complete search history.

(56) References Cited

U.S. PATENT DOCUMENTS

| | | | | |
|---|---|---|---|---|
| 5,649,055 | A | 7/1997 | Gupta et al. | |
| 5,774,849 | A * | 6/1998 | Benyassine et al. | 704/246 |
| 6,317,711 | B1 * | 11/2001 | Muroi | 704/253 |
| 6,535,851 | B1 | 3/2003 | Fanty et al. | |
| 6,570,986 | B1 * | 5/2003 | Wu et al. | 379/406.09 |
| 6,850,887 | B2 | 2/2005 | Epstein et al. | |
| 7,016,832 | B2 * | 3/2006 | Choi | 704/208 |
| 7,024,353 | B2 * | 4/2006 | Ramabadran | 704/205 |
| 7,171,357 | B2 | 1/2007 | Boland | |

(Continued)

FOREIGN PATENT DOCUMENTS

| | | | |
|---|---|---|---|
| CN | 1623186 | A | 6/2005 |
| CN | 101010722 | A | 8/2007 |

(Continued)

OTHER PUBLICATIONS

D. Wang., “An Auditory Scene Analysis Approach to Speech Segregation”, Available Apr. 19, 2011 online at http://www.ipam.ucla.edu/publications/es2005/es2005_5399.ppt.

(Continued)

*Primary Examiner* — Edgar Guerra-Erazo
(74) *Attorney, Agent, or Firm* — Austin Rapp & Hardman

(57) ABSTRACT

Systems, methods, apparatus, and machine-readable media for voice activity detection in a single-channel or multichannel audio signal are disclosed.

50 Claims, 26 Drawing Sheets

(56) References Cited

U.S. PATENT DOCUMENTS

| | | | | |
|---|---|---|---|---|
| 8,175,291 | B2 | 5/2012 | Chan et al. | |
| 8,219,391 | B2 * | 7/2012 | Preuss et al. | 704/214 |
| 8,260,609 | B2 | 9/2012 | Rajendran et al. | |
| 8,374,851 | B2 * | 2/2013 | Unno et al. | 704/208 |
| 8,724,829 | B2 | 5/2014 | Visser et al. | |
| 2001/0034601 | A1 | 10/2001 | Chujo et al. | |
| 2002/0172364 | A1 | 11/2002 | Mauro | |
| 2003/0053639 | A1 * | 3/2003 | Beaucoup et al. | 381/92 |
| 2003/0061036 | A1 | 3/2003 | Garudadri et al. | |
| 2003/0061042 | A1 | 3/2003 | Garudadri et al. | |
| 2004/0042626 | A1 | 3/2004 | Balan et al. | |
| 2005/0038651 | A1 | 2/2005 | Zhang et al. | |
| 2005/0108004 | A1 | 5/2005 | Otani et al. | |
| 2005/0131688 | A1 | 6/2005 | Goronzy et al. | |
| 2005/0143978 | A1 | 6/2005 | Martin et al. | |
| 2005/0246166 | A1 | 11/2005 | Creamer et al. | |
| 2006/0111901 | A1 | 5/2006 | Woo | |
| 2006/0217973 | A1 | 9/2006 | Gao et al. | |
| 2006/0270467 | A1 * | 11/2006 | Song et al. | 455/570 |
| 2007/0010999 | A1 | 1/2007 | Klein et al. | |
| 2007/0021958 | A1 | 1/2007 | Visser et al. | |
| 2007/0036342 | A1 | 2/2007 | Boillot et al. | |
| 2007/0154031 | A1 | 7/2007 | Avendano et al. | |
| 2007/0192094 | A1 | 8/2007 | Garudadri | |
| 2007/0265842 | A1 | 11/2007 | Jarvinen et al. | |
| 2008/0019548 | A1 | 1/2008 | Avendano | |
| 2008/0071531 | A1 | 3/2008 | Ong et al. | |
| 2008/0170728 | A1 | 7/2008 | Faller | |
| 2009/0089053 | A1 | 4/2009 | Wang et al. | |
| 2009/0304203 | A1 | 12/2009 | Haykin et al. | |
| 2010/0110834 | A1 | 5/2010 | Kim et al. | |
| 2010/0128894 | A1 | 5/2010 | Petit et al. | |
| 2011/0264447 | A1 | 10/2011 | Visser et al. | |

FOREIGN PATENT DOCUMENTS

| | | | |
|---|---|---|---|
| CN | 101236250 | A | 8/2008 |
| CN | 101548313 | A | 9/2009 |
| EP | 1953734 | A2 | 8/2008 |
| JP | H03211599 | A | 9/1991 |
| JP | H08314497 | A | 11/1996 |
| JP | H09204199 | A | 8/1997 |
| JP | 2000515987 | A | 11/2000 |
| JP | 2003076394 | A | 3/2003 |
| JP | 2008257110 | A | 10/2008 |
| JP | 2009092994 | A | 4/2009 |
| WO | WO-9801847 | A1 | 1/1998 |
| WO | WO-2008016935 | | 2/2008 |
| WO | WO2008143569 | A1 | 11/2008 |
| WO | WO-2009086017 | A1 | 7/2009 |
| WO | WO-2010038386 | A1 | 4/2010 |
| WO | WO-2010048620 | A1 | 4/2010 |

OTHER PUBLICATIONS

D. Wang., "Effects of Reverberation on Pitch, Onset/Offset, and Binaural Cues", Available Apr. 19, 2011 online at http://labrosa.ee.columbia.edu/Montreal2004/talks/deliang2.pdf.

D. Wang, et al., "Auditory Segmentation and Unvoiced Speech Segregation", Available Apr. 19, 2011 online at http://www.cse.ohio-state.edu/~dwang/talks/Hanse04.ppt.

G. Hu, et al., "Auditory Segmentation Based on Event Detection", Wkshp. on Stat. and Percep. Audio Proc. SAPA-2004, Jeju, KR, 6 pp. Available online Apr. 19, 2011 at www.cse.ohio-state.edu/~dwang/papers/Hu-Wang.sapa04.pdf.

G. Hu, et al., "Auditory Segmentation Based on Onset and Offset Analysis", IEEE Trans. ASLP, vol. 15, No. 2, Feb. 2007, pp. 396-405. Available online Apr. 19, 2011 at http://www.cse.ohio-state.edu/~dwang/papers/Hu-Wang.taslp07.pdf.

G. Hu, et al., "Auditory Segmentation Based on Onset and Offset Analysis", Technical Report OSU-CISRC-1/05-TR04, Ohio State Univ., pp. 1-11.

G. Hu, et al., "Separation of Stop Consonants", Proc. IEEE Int'l Conf. ASSP, 2003, pp. II-749-II-752. Available online Apr. 19, 2011 at http://www.cse.ohio-state.edu/~dwang/papers/Hu-Wang.icassp03.pdf.

G. Hu., "Monaural speech organization and segregation", Ph.D. thesis, Ohio State Univ., 2006, 202 pp.

J. Kim, et al., "Design of a VAD Algorithm for Variable Rate Coder in CDMA Mobile Communication Systems", IITA-2025-143, Institute of Information Technology Assessment, Korea, pp. 1-13.

K.V. Sorensen, et al., "Speech presence detection in the time-frequency domain using minimum statistics", Proc. 6th Nordic Sig. Proc. Symp. NORSIG 2004, Jun. 9-11, Espoo, FI, pp. 340-343.

R. Martin., "Statistical methods for the enhancement of noisy speech", Intl Wkshp. Acoust. Echo and Noise Control (IWAENC2003), Sep. 2003, Kyoto, JP, 6 pp.

Rainer Martin: "Noise Power Spectral Density Estimation Based on Optimal Smoothing and Minimum Statistics" IEEE Transactions on Speech and Audio Processing, IEEE Service Center, New York, NY, US, vol. 9, No. 5, Jul. 1, 2001, pp. 504-512, XP011054118.

S. Srinivasan., "A Computational Auditory Scene Analysis System for Robust Speech Recognition", To appear in Proc. Interspeech Sep. 17-21, 2006, Pittsburgh, PA, 4 pp.

T. Esch, et al., "A Modified Minimum Statistics Algorithm for Reducing Time Varying Harmonic Noise", Paper 3, 4 pp. Available Apr. 20, 2011 online at http://www.ind.rwth-aachen.de/fileadmin/publications/esch10a.pdf.

V. Stouten, et al., "Application of minimum statistics and minima controlled recursive averaging methods to estimate a cepstral noise model for robust ASR", 4 pp. Available Apr. 20, 2011 online at http://www.esat.kuleuven.be/psi/spraak/cgi-bin/get_file.cgi?/vstouten/icassp06/stouten.pdf.

Y. Shao, et al., "A Computational Auditory Scene Analysis System for Speech Segregation and Robust Speech Recognition", Technical Report OSU-CISRC-8/07-TR62, pp. 1-20.

Y.-S. Park, et al., "A Probabilistic Combination Method of Minimum Statistics and Soft Decision for Robust Noise Power Estimation in Speech Enhancement", IEEE Sig. Proc. Let., vol. 15, 2008, pp. 95-98.

Beritelli F, et al., "A Multi-Channel Speech/Silence Detector Based on Time Delay Estimation and Fuzzy Classification", 1999 IEEE International Conference on Acoustics, Speech, and Signal Processing. Phoenix, AZ, March 15-19, 1999; [IEEE International Conference on Acoustics, Speech, and Signal Processing (ICASSP)], New York, NY : IEEE, US, Mar. 15, 1999, pp. 93-96, XP000898270, ISBN: 978-0-7803-5042-7.

International Search Report and Written Opinion—PCT/US2011/057715—ISA/EPO—Jan. 30, 2012.

Ishizuka K, et al., "Speech Activity Detection for Multi-Party Conversation Analyses Based on Likelihood Ratio Test on Spatial Magnitude", IEEE Transactions on Audio, Speech and Language Processing, IEEE Service Center, New York, NY, USA, vol. 18, No. 6, Aug. 1, 2010, pp. 1354-1365, XP011329203, ISSN: 1558-7916, DOI: 10.1109/TASL.2009.2033955.

Karray L, et al., "Towards improving speech detection robustness for speech recognition in adverse conditions", Speech Communication, Elsevier Science Publishers, Amsterdam, NL, vol. 40, No. 3, May 1, 2003, pp. 261-276, XP002267781, ISSN: 0167-6393, DOI: 10.1016/S0167-6393 (02)00066-3 p. 263, section 2.3, first paragraph.

Pfau T, et al., "Multispeaker speech activity detection for the ICSI meeting recorder", Automatic Speech Recognition and Understanding, 2001. ASRU01. IEEE Workshop on Dec. 9-13, 2001, Piscataway, NJ, USA,IEEE, Dec. 9, 2001, pp. 107-110, XP010603688, ISBN: 978-0-7803-7343-3.

Nagata Y., et al., "Target Signal Detection System Using Two Directional Microphones," Transactions of the Institute of Electronics, Information and Communication Engineers, Dec. 2000, vol. J83-A, No. 12, pp. 1445-1454.

* cited by examiner

| SNR<br>Holding pattern | 6 dB | | 12dB | |
|---|---|---|---|---|
| | P_miss | P_fa | P_miss | P_fa |
| -30 deg | 10.64% | 14.84% | 04.60% | 16.48% |
| -50 deg | 10.98% | 14.32% | 04.65% | 16.74% |
| -70 deg | 11.97% | 15.89% | 05.74% | 17.53% |
| -90 deg | 15.88% | 16.20% | 08.26% | 17.47% |

FIG. 18

SYSTEMS, METHODS, AND APPARATUS FOR VOICE ACTIVITY DETECTION

CLAIM OF PRIORITY UNDER 35 U.S.C. §119

The present Application for Patent claims priority to Provisional Application No. 61/406,382, entitled "DUAL-MICROPHONE COMPUTATIONAL AUDITORY SCENE ANALYSIS FOR NOISE REDUCTION," filed Oct. 25, 2010, and assigned to the assignee hereof.

CLAIM OF PRIORITY UNDER 35 U.S.C. §120

The present Application for Patent is a continuation-in-part of pending U.S. patent application Ser. No. 13/092,502, entitled "SYSTEMS, METHODS, AND APPARATUS FOR SPEECH FEATURE DETECTION,", filed Apr. 22, 2011, and assigned to the assignee hereof.

BACKGROUND

1. Field

This disclosure relates to audio signal processing.

2. Background

Many activities that were previously performed in quiet office or home environments are being performed today in acoustically variable situations like a car, a street, or a café. For example, a person may desire to communicate with another person using a voice communication channel. The channel may be provided, for example, by a mobile wireless handset or headset, a walkie-talkie, a two-way radio, a car-kit, or another communications device. Consequently, a substantial amount of voice communication is taking place using portable audio sensing devices (e.g., smartphones, handsets, and/or headsets) in environments where users are surrounded by other people, with the kind of noise content that is typically encountered where people tend to gather. Such noise tends to distract or annoy a user at the far end of a telephone conversation. Moreover, many standard automated business transactions (e.g., account balance or stock quote checks) employ voice-recognition-based data inquiry, and the accuracy of these systems may be significantly impeded by interfering noise.

For applications in which communication occurs in noisy environments, it may be desirable to separate a desired speech signal from background noise. Noise may be defined as the combination of all signals interfering with or otherwise degrading the desired signal. Background noise may include numerous noise signals generated within the acoustic environment, such as background conversations of other people, as well as reflections and reverberation generated from the desired signal and/or any of the other signals. Unless the desired speech signal is separated from the background noise, it may be difficult to make reliable and efficient use of it. In one particular example, a speech signal is generated in a noisy environment, and speech processing methods are used to separate the speech signal from the environmental noise.

Noise encountered in a mobile environment may include a variety of different components, such as competing talkers, music, babble, street noise, and/or airport noise. As the signature of such noise is typically nonstationary and close to the user's own frequency signature, the noise may be hard to model using traditional single microphone or fixed beamforming type methods. Single-microphone noise reduction techniques typically require significant parameter tuning to achieve optimal performance. For example, a suitable noise reference may not be directly available in such cases, and it may be necessary to derive a noise reference indirectly.

Therefore multiple-microphone based advanced signal processing may be desirable to support the use of mobile devices for voice communications in noisy environments.

SUMMARY

A method of processing an audio signal according to a general configuration includes calculating, based on information from a first plurality of frames of the audio signal, a series of values of a first voice activity measure. This method also includes calculating, based on information from a second plurality of frames of the audio signal, a series of values of a second voice activity measure that is different from the first voice activity measure. This method also includes calculating, based on the series of values of the first voice activity measure, a boundary value of the first voice activity measure. This method also includes producing, based on the series of values of the first voice activity measure, the series of values of the second voice activity measure, and the calculated boundary value of the first voice activity measure, a series of combined voice activity decisions. Computer-readable storage media (e.g., non-transitory media) having tangible features that cause a machine reading the features to perform such a method are also disclosed.

An apparatus for processing an audio signal according to a general configuration includes means for calculating a series of values of a first voice activity measure, based on information from a first plurality of frames of the audio signal, and means for calculating a series of values of a second voice activity measure that is different from the first voice activity measure, based on information from a second plurality of frames of the audio signal. This apparatus also includes means for calculating a boundary value of the first voice activity measure, based on the series of values of the first voice activity measure, and means for producing a series of combined voice activity decisions, based on the series of values of the first voice activity measure, the series of values of the second voice activity measure, and the calculated boundary value of the first voice activity measure.

An apparatus for processing an audio signal according to another general configuration includes a first calculator configured to calculate a series of values of a first voice activity measure, based on information from a first plurality of frames of the audio signal, and a second calculator configured to calculate a series of values of a second voice activity measure that is different from the first voice activity measure, based on information from a second plurality of frames of the audio signal. This apparatus also includes a boundary value calculator configured to calculate a boundary value of the first voice activity measure, based on the series of values of the first voice activity measure, and a decision module configured to produce a series of combined voice activity decisions, based on the series of values of the first voice activity measure, the series of values of the second voice activity measure, and the calculated boundary value of the first voice activity measure.

BRIEF DESCRIPTION OF THE DRAWINGS

FIG. 18 shows a table of probabilities.

DETAILED DESCRIPTION

Figure 1:
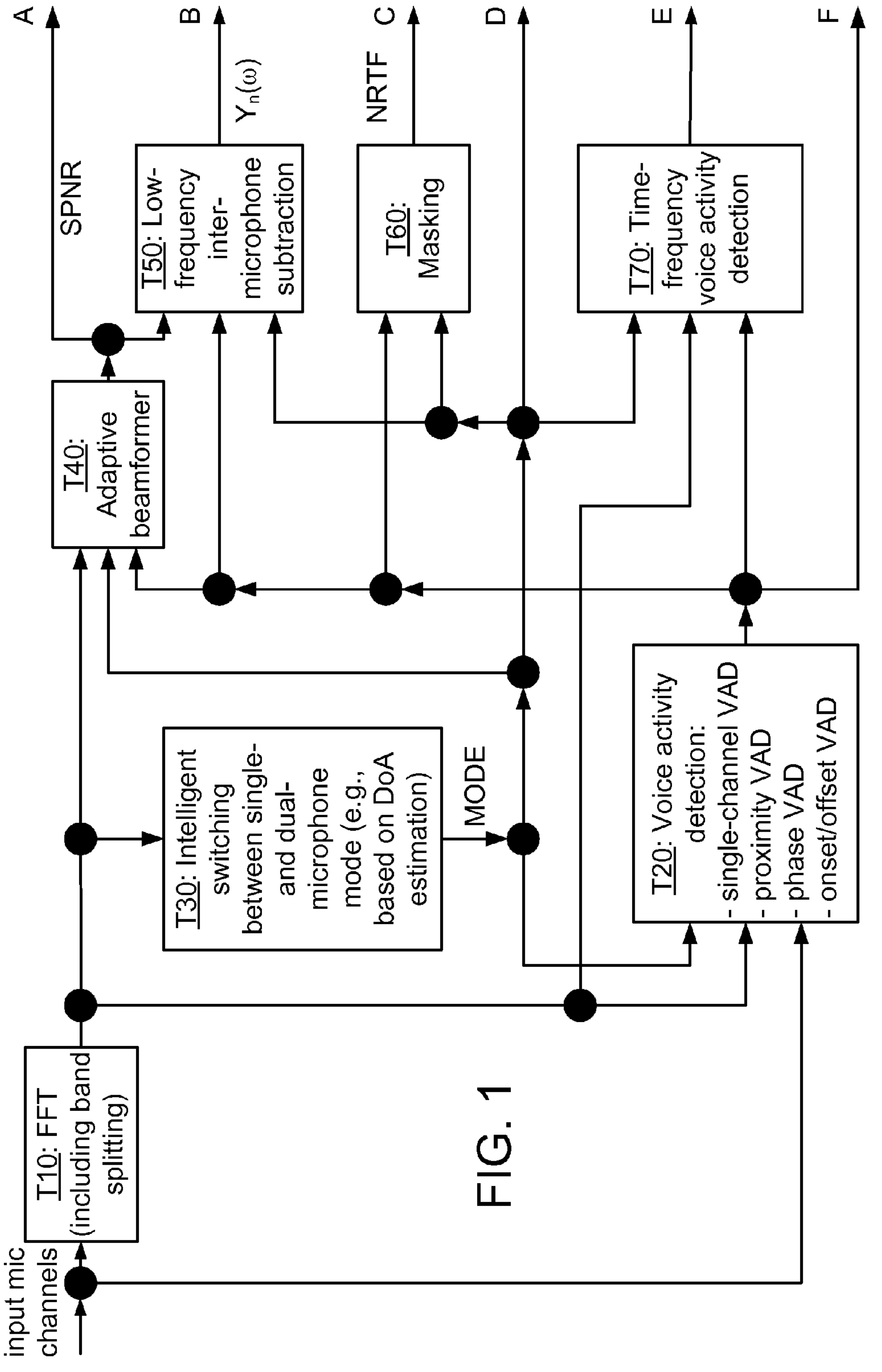
FIGS. 1 and 2 show a block diagram of a dual-microphone noise suppression system.

The techniques disclosed herein may be used to improve voice activity detection (VAD) in order to enhance speech processing, such as voice coding. The disclosed VAD techniques may be used to improve the accuracy and reliability of voice detection, and thus, to improve functions that depend on VAD, such as noise reduction, echo cancellation, rate coding and the like. Such improvement may be achieved, for example, by using VAD information that may be provided from one or more separate devices. The VAD information may be generated using multiple microphones or other sensor modalities to provide a more accurate voice activity detector.

Use of a VAD as described herein may be expected to reduce speech processing errors that are often experienced in traditional VAD, particularly in low signal-to-noise-ratio (SNR) scenarios, in non-stationary noise and competing voices cases, and other cases where voice may be present. In addition, a target voice may be identified, and such a detector may be used to provide a reliable estimation of target voice activity. It may be desirable to use VAD information to control vocoder functions, such as noise estimation update, echo cancellation (EC), rate-control, and the like. A more reliable and accurate VAD can be used to improve speech processing functions such as the following: noise reduction (NR) (i.e., with more reliable VAD, higher NR may be performed in non-voice segments); voice and non-voiced segment estimation; echo cancellation (EC); improved double detection schemes; and rate coding improvements which allow more aggressive rate coding schemes (for example, a lower rate for non-voice segments).

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least."

References to a "location" of a microphone of a multi-microphone audio sensing device indicate the location of the center of an acoustically sensitive face of the microphone, unless otherwise indicated by the context. The term "channel" is used at times to indicate a signal path and at other times to indicate a signal carried by such a path, according to the particular context. Unless otherwise indicated, the term "series" is used to indicate a sequence of two or more items. The term "logarithm" is used to indicate the base-ten logarithm, although extensions of such an operation to other bases are within the scope of this disclosure. The term "frequency component" is used to indicate one among a set of frequencies or frequency bands of a signal, such as a sample of a frequency domain representation of the signal (e.g., as produced by a fast Fourier transform) or a subband of the signal (e.g., a Bark scale or mel scale subband). Unless the context indicates otherwise, the term "offset" is used herein as an antonym of the term "onset."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose."

Any incorporation by reference of a portion of a document shall also be understood to incorporate definitions of terms or variables that are referenced within the portion, where such definitions appear elsewhere in the document, as well as any figures referenced in the incorporated portion. Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, each of the terms "plurality" and "set" is used herein to indicate an integer quantity that is greater than one.

A method as described herein may be configured to process the captured signal as a series of segments. Typical segment lengths range from about five or ten milliseconds to about forty or fifty milliseconds, and the segments may be overlapping (e.g., with adjacent segments overlapping by 25% or 50%) or nonoverlapping. In one particular example, the signal is divided into a series of nonoverlapping segments or "frames", each having a length of ten milliseconds. A segment as processed by such a method may also be a segment (i.e., a "subframe") of a larger segment as processed by a different operation, or vice versa.

Figure 2:
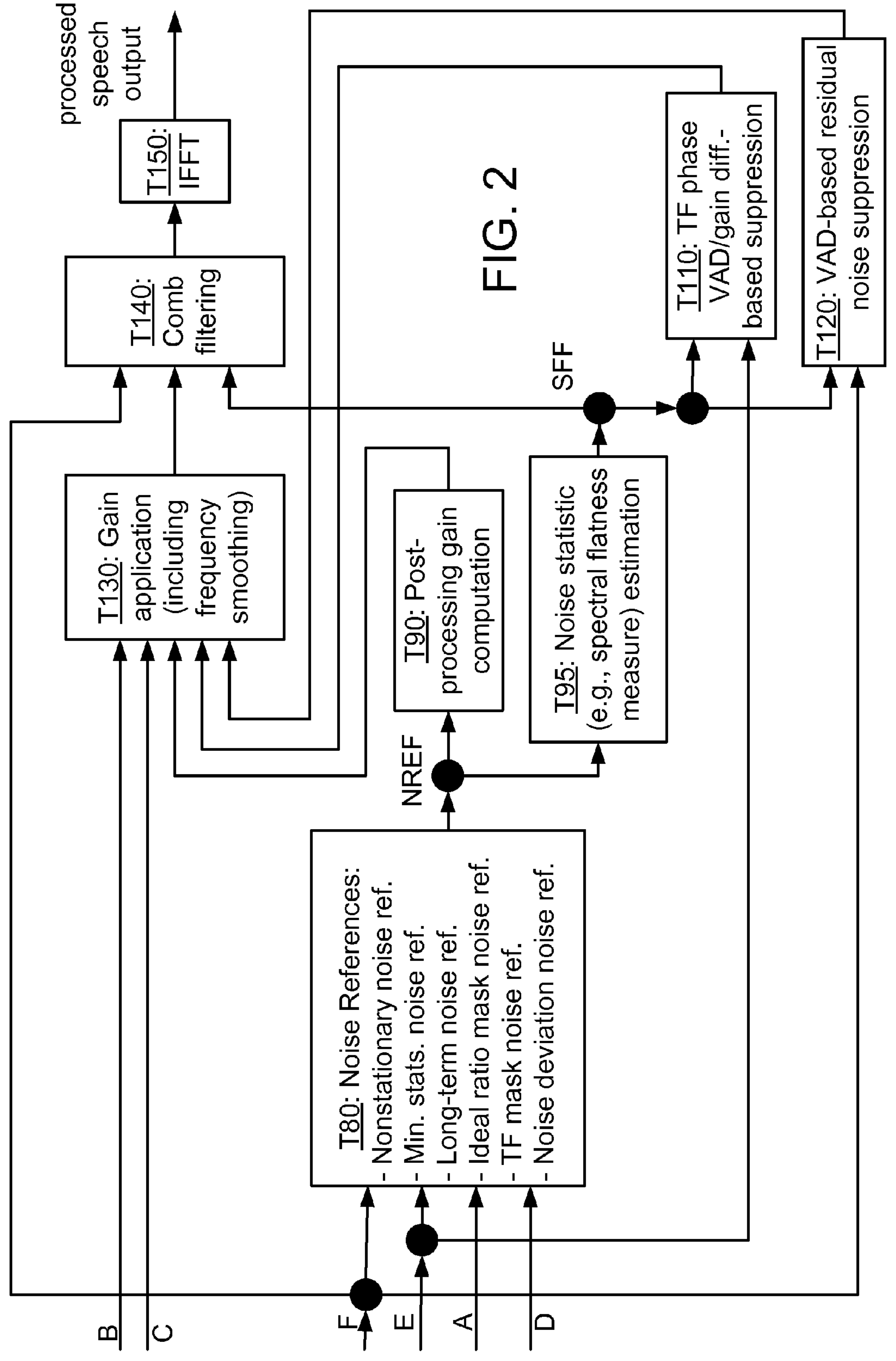
Figures 3A, 3B, 3C:
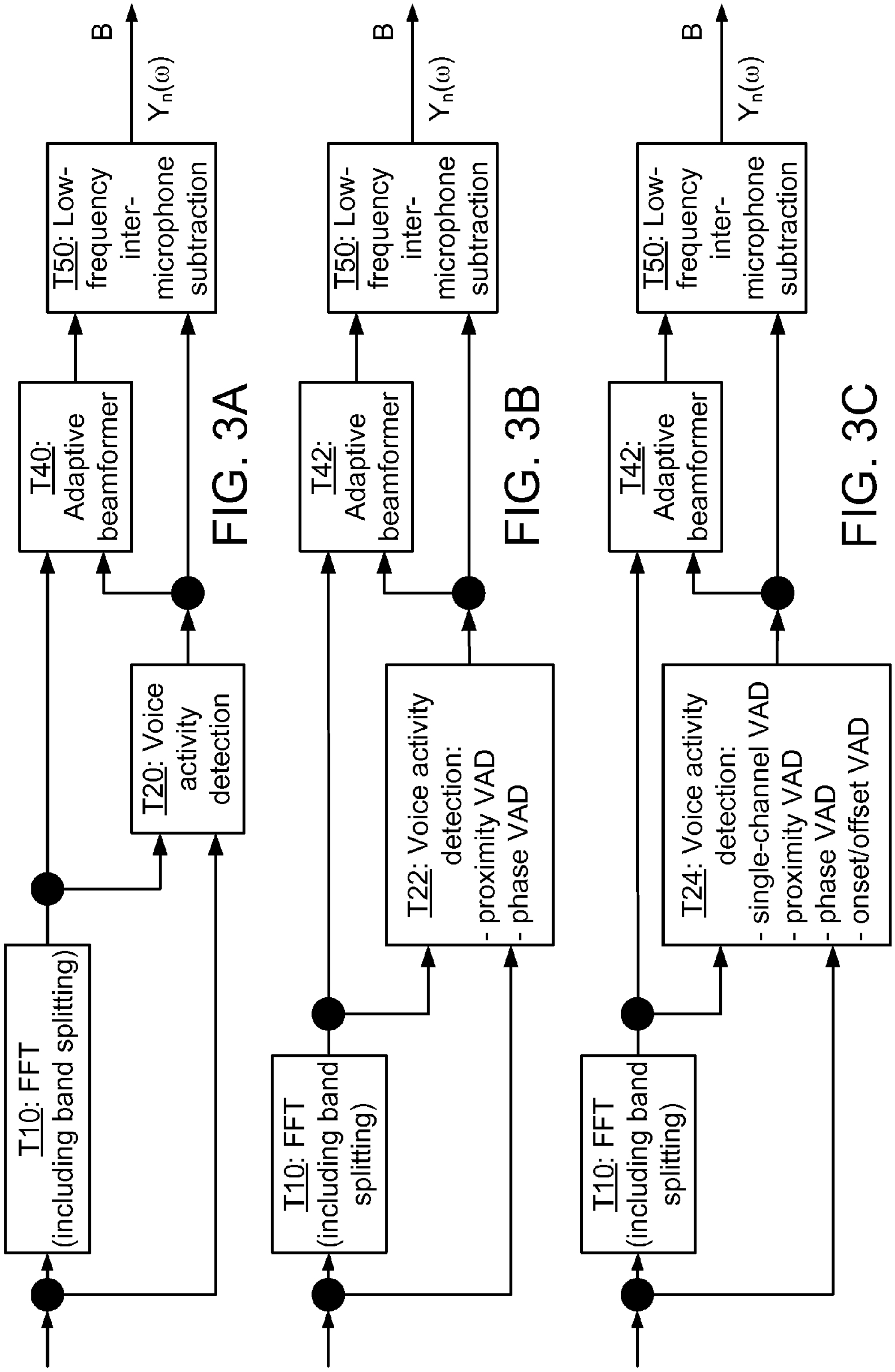
FIGS. 3A-3C and FIG. 4 show examples of subsets of the system of FIGS. 1 and 2.
Figure 4:
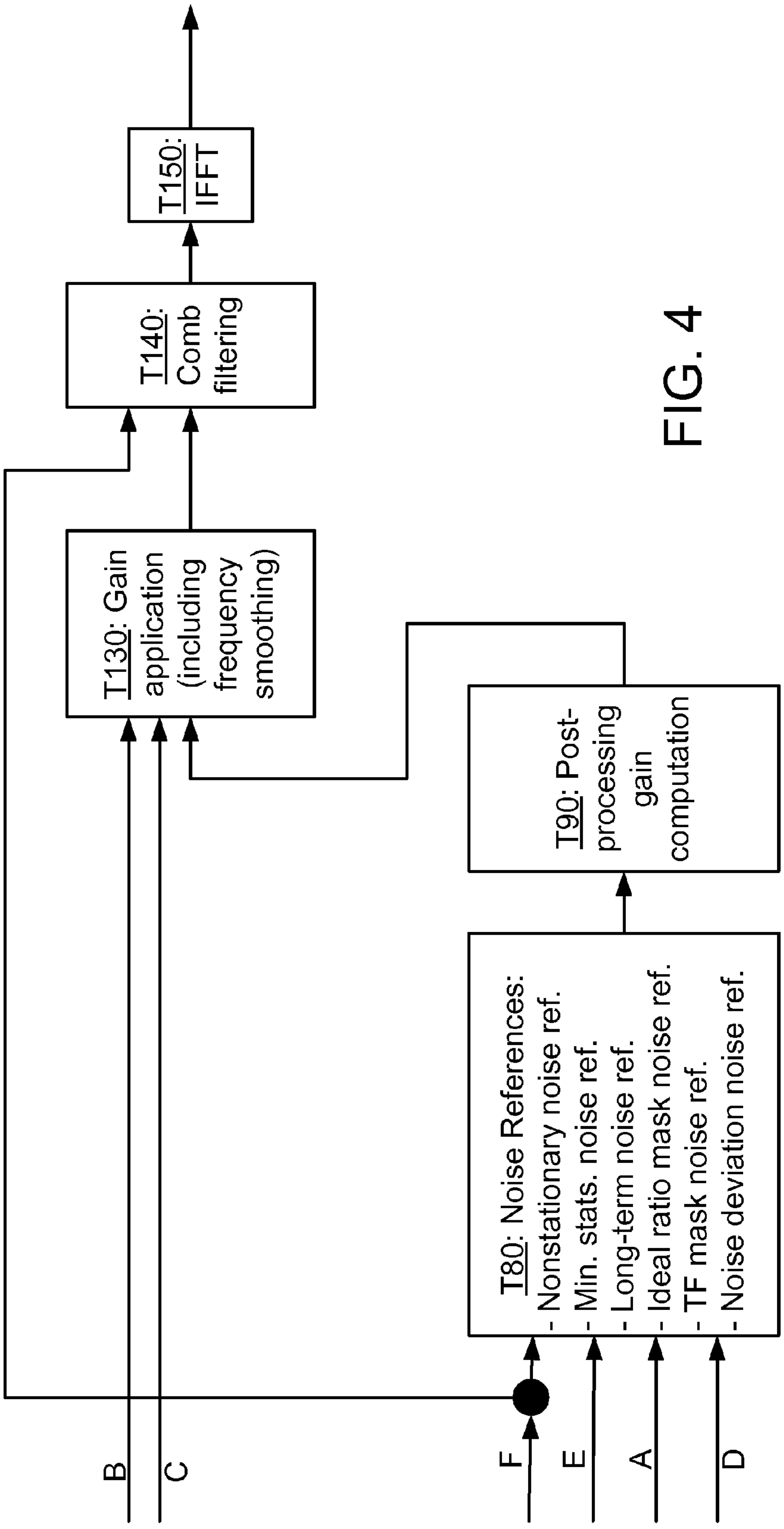

Existing dual-microphone noise suppression solutions may be insufficiently robust to holding angle variability and/or microphone gain calibration mismatch. The present disclosure provides ways to resolve this issue. Several novel ideas are described herein that can lead to better voice activity detection and/or noise suppression performance. FIGS. 1 and 2 show a block diagram of a dual-microphone noise suppression system that includes examples of some of these techniques, with the labels A-F indicating the correspondence between the signals exiting to the right of FIG. 1 and the same signals entering to the left of FIG. 2.

Features of a configuration as described herein may include one or more (possibly all) of the following: low-frequency noise suppression (e.g., including inter-microphone subtraction and/or spatial processing); normalization of the VAD test statistics to maximize discrimination power for various holding angles and microphone gain mismatch; noise reference combination logic; residual noise suppression based on phase and proximity information in each time-frequency cell as well as frame-by-frame voice activity information; and residual noise suppression control based on one or more noise characteristics (for example, spectral flatness measure of the estimated noise). Each of these items is discussed in the following sections.

It is also expressly noted that any one or more of these tasks shown in FIGS. 1 and 2 may be implemented independently of the rest of the system (e.g., as part of another audio signal processing system). FIGS. 3A-3C and FIG. 4 show examples of subsets of the system that may be used independently.

The class of spatially selective filtering operations includes directionally selective filtering operations, such as beamforming and/or blind source separation, and distance-selective filtering operations, such as operations based on source proximity. Such operations can achieve substantial noise reduction with negligible voice impairments.

A typical example of a spatially selective filtering operation includes computing adaptive filters (e.g., based on one or more suitable voice activity detection signals) to remove desired speech to generate a noise channel and/or to remove unwanted noise by performing subtraction of a spatial noise reference and a primary microphone signal. FIG. 7B shows a block diagram of an example of such a scheme in which $$\begin{aligned} Y_n(\omega) &= Y_1(\omega) - W_2(\omega) * (Y_2(\omega) - W_1(\omega) * Y_1(\omega)) \\ &= (1 + W_2(\omega)W_1(\omega)) * Y_1(\omega) - W_2(\omega) * Y_2(\omega). \end{aligned} \tag{4}$$

Removal of low-frequency noise (e.g., noise in a frequency range of 0-500 Hz) poses unique challenges. To obtain a frequency resolution that is sufficient to support discrimination of valleys and peaks related to the harmonic voiced speech structure, it may be desirable to use a fast Fourier transform (FFT) having a length of at least 256 (e.g., for a narrowband signal having a range of about 0-4 kHz). Fourier-domain circular convolution problems may compel the use of short filters, which may hamper effective post-processing of such a signal. The effectiveness of a spatially selective filtering operation may also be limited in the low-frequency range by the microphone distance and in the high frequencies by spatial aliasing. For example, spatial filtering is typically largely ineffective in the range of 0-500 Hz.

During a typical use of a handheld device, the device may be held in various orientations with respect to the user's mouth. The SNR may be expected to differ from one microphone to another for most handset holding angles. However, the distributed noise level may be expected to remain approximately equal from one microphone to another. Consequently, inter-microphone channel subtraction may be expected to improve SNR in the primary microphone channel.

Figure 5:
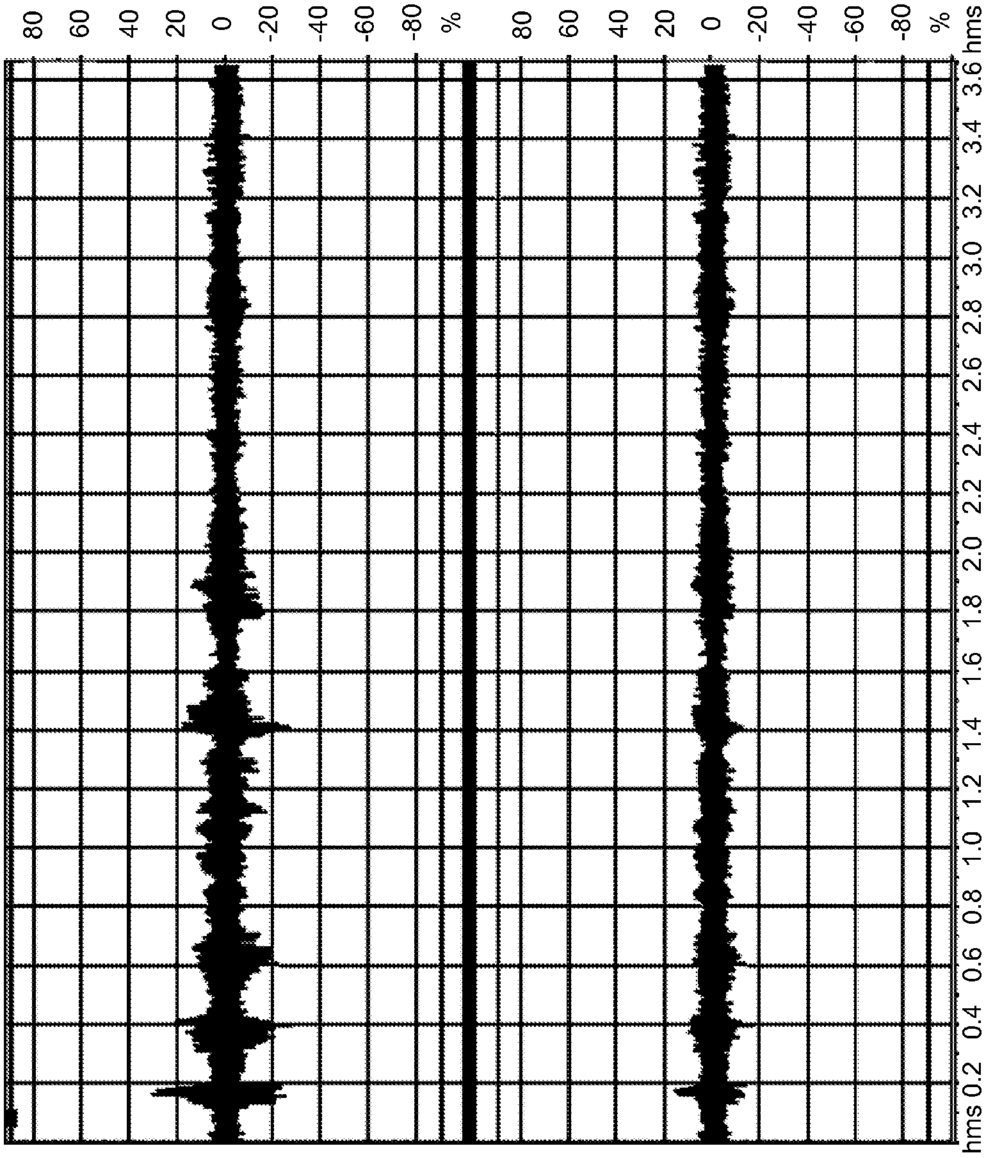
FIGS. 5 and 6 show an example of a stereo speech recording in car noise.
Figure 6:
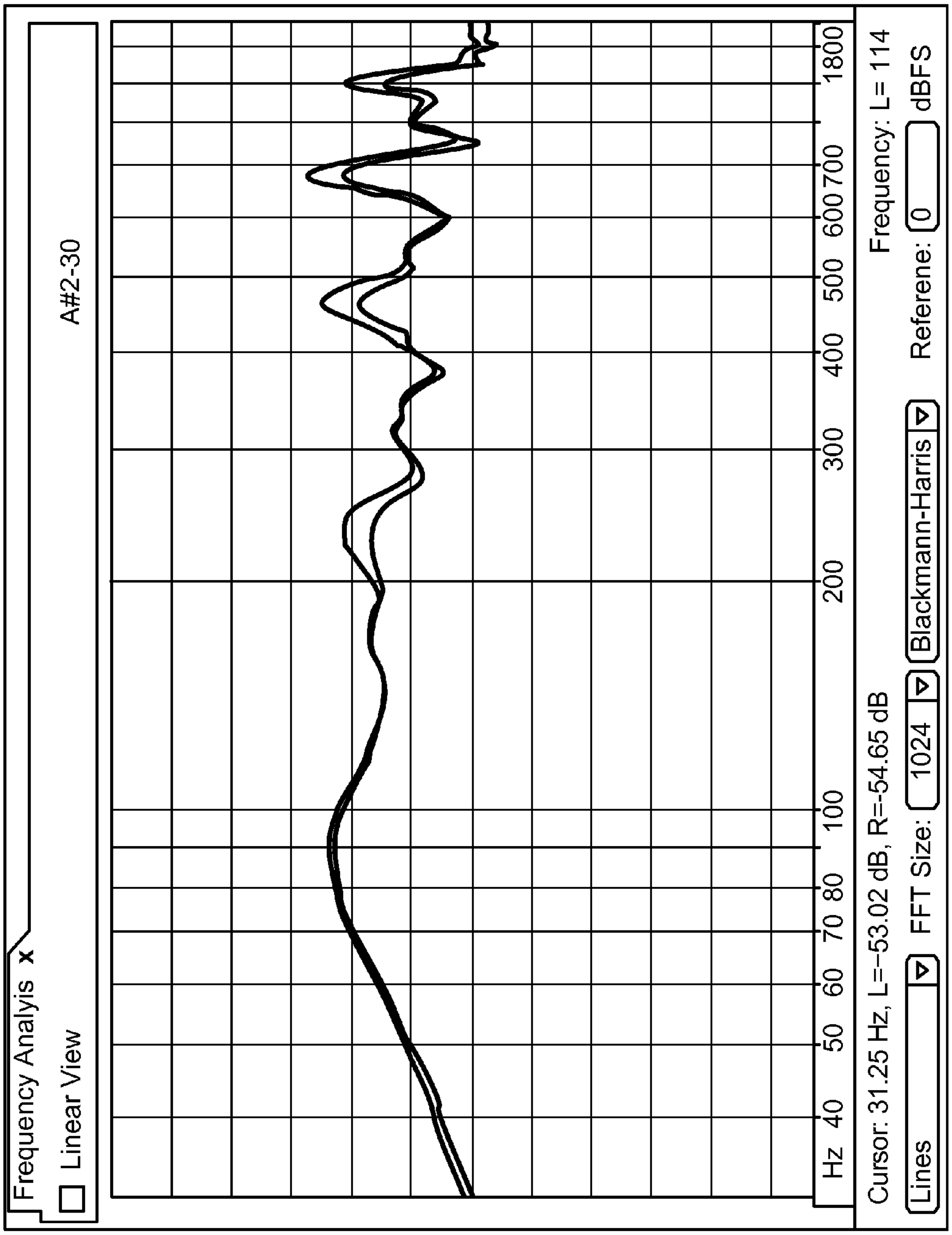

FIGS. 5 and 6 show an example of a stereo speech recording in car noise, where FIG. 5 shows a plot of the time-domain signal and FIG. 6 shows a plot of the frequency spectrum. In each case, the upper trace corresponds to the signal from the primary microphone (i.e., the microphone that is oriented toward the user's mouth or otherwise receives the user's voice most directly) and the lower trace corresponds to the signal from the secondary microphone. The frequency spectrum plot shows that the SNR is better in the primary microphone signal. For example, it may be seen that voiced speech peaks are higher in the primary microphone signal, while background noise valleys are about equally loud between the channels. Inter-microphone channel subtraction may typically be expected to result in 8-12 dB noise reduction in the [0-500 Hz] band with very little voice distortion, which is similar to the noise reduction results that may be obtained by spatial processing using large microphone arrays with many elements.

Low-frequency noise suppression may include inter-microphone subtraction and/or spatial processing. One example of a method of reducing noise in a multichannel audio signal includes using an inter-microphone difference for frequencies less than 500 Hz, and using a spatially selective filtering operation (e.g., a directionally selective operation, such as a beamformer) for frequencies greater than 500 Hz.

It may be desirable to use an adaptive gain calibration filter to avoid a gain mismatch between two microphone channels.

Such a filter may be calculated according to a low-frequency gain difference between the signals from the primary and secondary microphones. For example, a gain calibration filter M may be obtained over a speech-inactive interval according to an expression such as $$\|M(\omega)\| = \frac{\|Y_1(\omega)\|}{\|Y_2(\omega)\|}, \tag{1}$$

where ω denotes frequency, $Y_1$ denotes the primary microphone channel, $Y_2$ denotes the secondary microphone channel, and $\|\cdot\|$ denotes a vector norm operation (e.g., an L2-norm).

In most applications the secondary microphone channel may be expected to contain some voice energy, such that the overall voice channel may be attenuated by a simple subtraction process. Consequently, it may be desirable to introduce a make-up gain to scale the voice gain back to its original level. One example of such a process may be summarized by an expression such as $$\|Y_n(\omega)\| = G*(\|Y_1(\omega)\| - \|M(\omega)*Y_2(\omega)\|), \tag{2}$$

where $Y_n$ denotes the resulting output channel and G denotes an adaptive voice make-up gain factor. The phase may be obtained from the original primary microphone signal.

The adaptive voice make-up gain factor G may be determined by low-frequency voice calibration over [0-500 Hz] to avoid introducing reverberation. Voice make-up gain G can be obtained over a speech-active interval according to an expression such as $$\|G\| = \frac{\sum \|Y_1(\omega)\|}{\sum (\|Y_1(\omega)\| - \|Y_2(\omega)\|)}. \tag{3}$$

In the [0-500 Hz] band, such inter-microphone subtraction may be preferred to an adaptive filtering scheme. For the typical microphone spacing employed on handset form factors, the low-frequency content (e.g., in the [0-500 Hz] range) is usually highly correlated between channels, which may lead in fact to amplification or reverberation of low-frequency content. In a proposed scheme, the adaptive beamforming output $Y_n$ is overwritten with the inter-microphone subtraction module below 500 Hz. However, the adaptive null beamforming scheme also produces a noise reference, which is used in a post-processing stage.

Figure 7A:
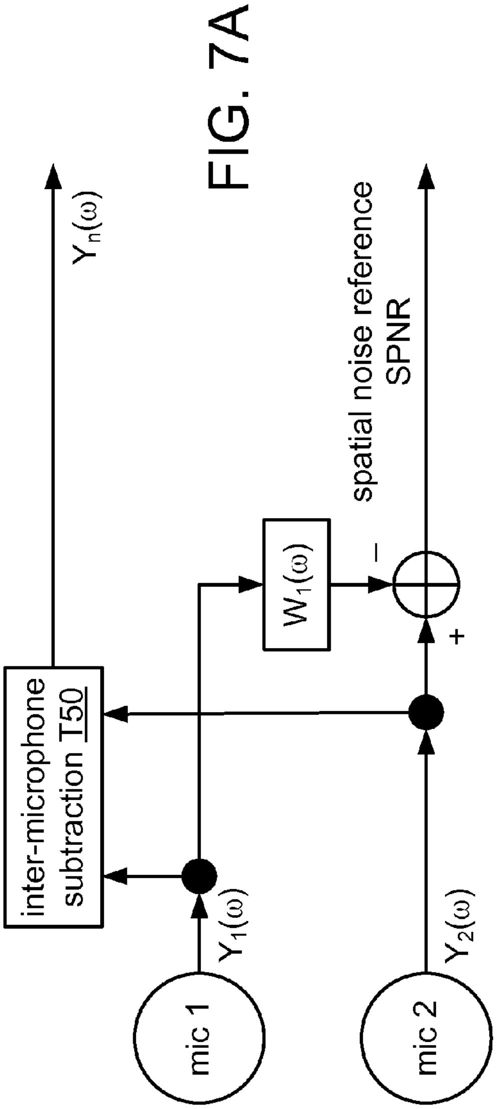
FIGS. 7A and 7B summarize an example of an inter-microphone subtraction method T50.
Figure 7B:
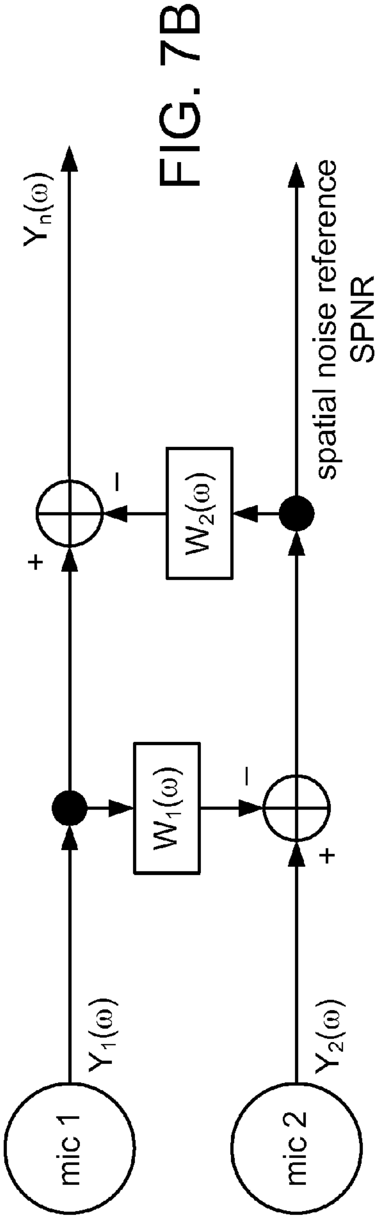

FIGS. 7A and 7B summarize an example of such an inter-microphone subtraction method T50. For low frequencies (e.g., in the [0-500 Hz] range), inter-microphone subtraction provides the "spatial" output $Y_n$ as shown in FIG. 3, while an adaptive null beamformer still supplies the noise reference SPNR. For higher-frequency ranges (e.g., >500 Hz), the adaptive beamformer provides the output $Y_n$ as well as the noise reference SPNR, as shown in FIG. 7B.

Voice activity detection (VAD) is used to indicate the presence or absence of human speech in segments of an audio signal, which may also contain music, noise, or other sounds. Such discrimination of speech-active frames from speech-inactive frames is an important part of speech enhancement and speech coding, and voice activity detection is an important enabling technology for a variety of speech-based applications. For example, voice activity detection may be used to support applications such as voice coding and speech recognition. Voice activity detection may also be used to deactivate some processes during non-speech segments. Such deactivation may be used to avoid unnecessary coding and/or transmission of silent frames of the audio signal, saving on computation and network bandwidth. A method of voice activity detection (e.g., as described herein) is typically configured to iterate over each of a series of segments of an audio signal to indicate whether speech is present in the segment.

It may be desirable for a voice activity detection operation within a voice communications system to be able to detect voice activity in the presence of very diverse types of acoustic background noise. One difficulty in the detection of voice in noisy environments is the very low signal-to-noise ratios (SNRs) that are sometimes encountered. In these situations, it is often difficult to distinguish between voice and noise, music, or other sounds using known VAD techniques.

One example of a voice activity measure (also called a "test statistic") that may be calculated from an audio signal is signal energy level. Another example of a voice activity measure is the number of zero crossings per frame (i.e., the number of times the sign of the value of the input audio signal changes from one sample to the next). Results of pitch estimation and detection algorithms may also be used to as voice activity measures, as well as results of algorithms that compute formants and/or cepstral coefficients to indicate the presence of voice. Further examples include voice activity measures based on SNR and voice activity measures based on likelihood ratio. Any suitable combination of two or more voice activity measures may also be employed.

A voice activity measure may be based on speech onset and/or offset. It may be desirable to perform detection of speech onsets and/or offsets based on the principle that a coherent and detectable energy change occurs over multiple frequencies at the onset and offset of speech. Such an energy change may be detected, for example, by computing first-order time derivatives of energy (i.e., rate of change of energy over time) over all frequency bands, for each of a number of different frequency components (e.g., subbands or bins). In such case, a speech onset may be indicated when a large number of frequency bands show a sharp increase in energy, and a speech offset may be indicated when a large number of frequency bands show a sharp decrease in energy. Additional description of voice activity measures based on speech onset and/or offset may be found in U.S. patent application Ser. No. 13/092,502, filed Apr. 20, 2011, entitled "SYSTEMS, METHODS, AND APPARATUS FOR SPEECH FEATURE DETECTION."

For an audio signal that has more than one channel, a voice activity measure may be based on a difference between the channels. Examples of voice activity measures that may be calculated from a multi-channel signal (e.g., a dual-channel signal) include measures based on a magnitude difference between channels (also called gain-difference-based, level-difference-based, or proximity-based measures) and measures based on phase differences between channels. For the phase-difference-based voice activity measure, the test statistic used in this example is the average number of frequency bins with the estimated DoA in the range of look direction (also called a phase coherency or directional coherency measure), where DoA may be calculated as a ratio of phase difference to frequency. For the magnitude-difference-based voice activity measure, the test statistic used in this example is the log RMS level difference between the primary and the secondary microphones. Additional description of voice activity measures based on magnitude and phase differences between channels may be found in U.S. Publ. Pat. Appl. No. 2010/00323652, entitled "SYSTEMS, METHODS, APPA- RATUS, AND COMPUTER-READABLE MEDIA FOR PHASE-BASED PROCESSING OF MULTICHANNEL SIGNAL."

Another example of a magnitude-difference-based voice activity measure is a low-frequency proximity-based measure. Such a statistic may be calculated as a gain difference (e.g., log RMS level difference) between channels in a low-frequency region, such as below 1 kHz, below 900 Hz, or below 500 Hz.

A binary voice activity decision may be obtained by applying a threshold value to the voice activity measure value (also called a score). Such a measure may be compared to a threshold value to determine voice activity. For example, voice activity may be indicated by an energy level that is above a threshold, or a number of zero crossings that is above a threshold. Voice activity may also be determined by comparing frame energy of a primary microphone channel to an average frame energy.

It may be desirable to combine multiple voice activity measures to obtain a VAD decision. For example, it may be desirable to combine multiple voice activity decisions using AND and/or OR logic. The measures to be combined may have different resolutions in time (e.g., a value for every frame vs. every other frame).

Figure 15:
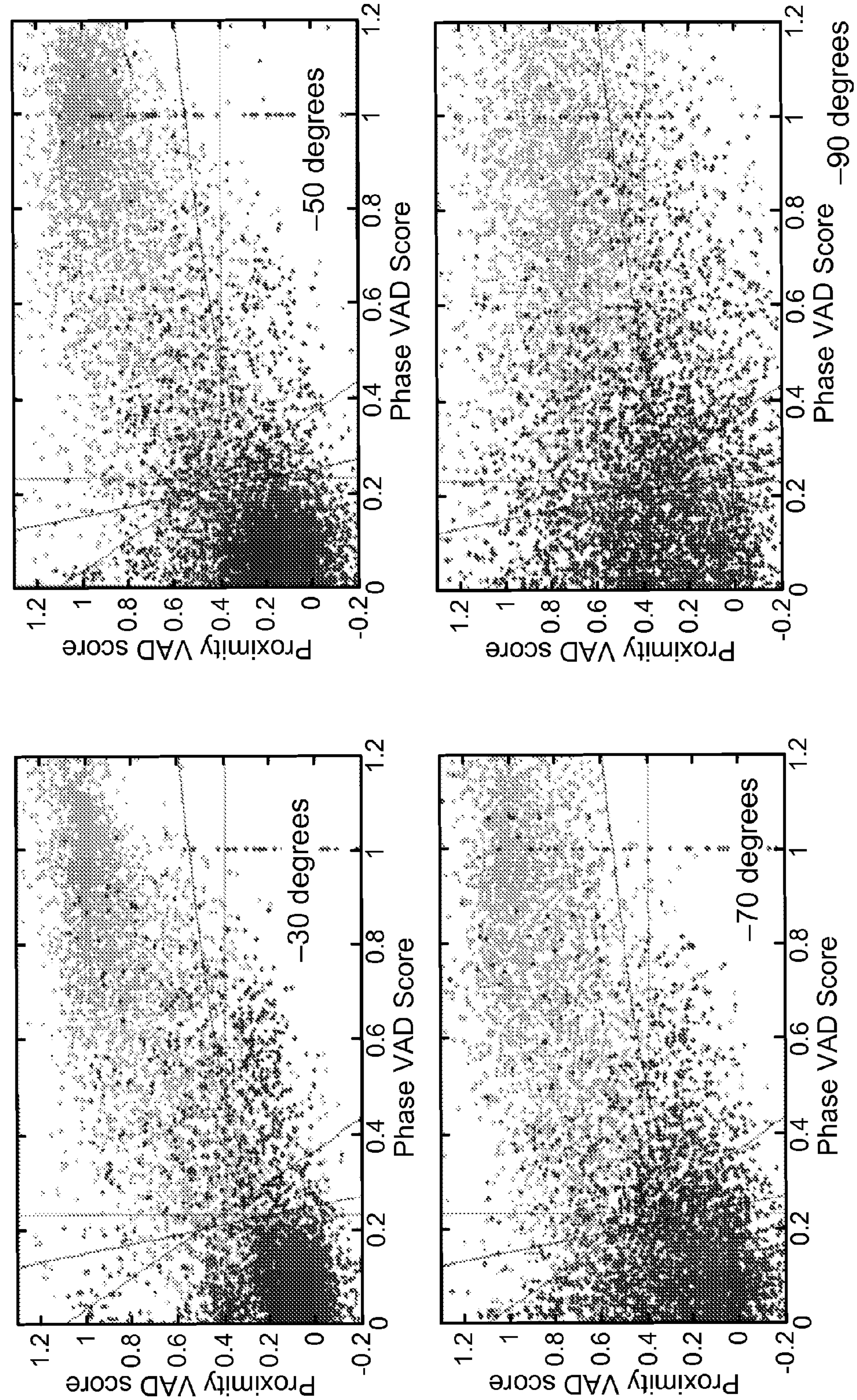
FIG. 15 shows scatter plots for normalized test statistics.
Figure 16:
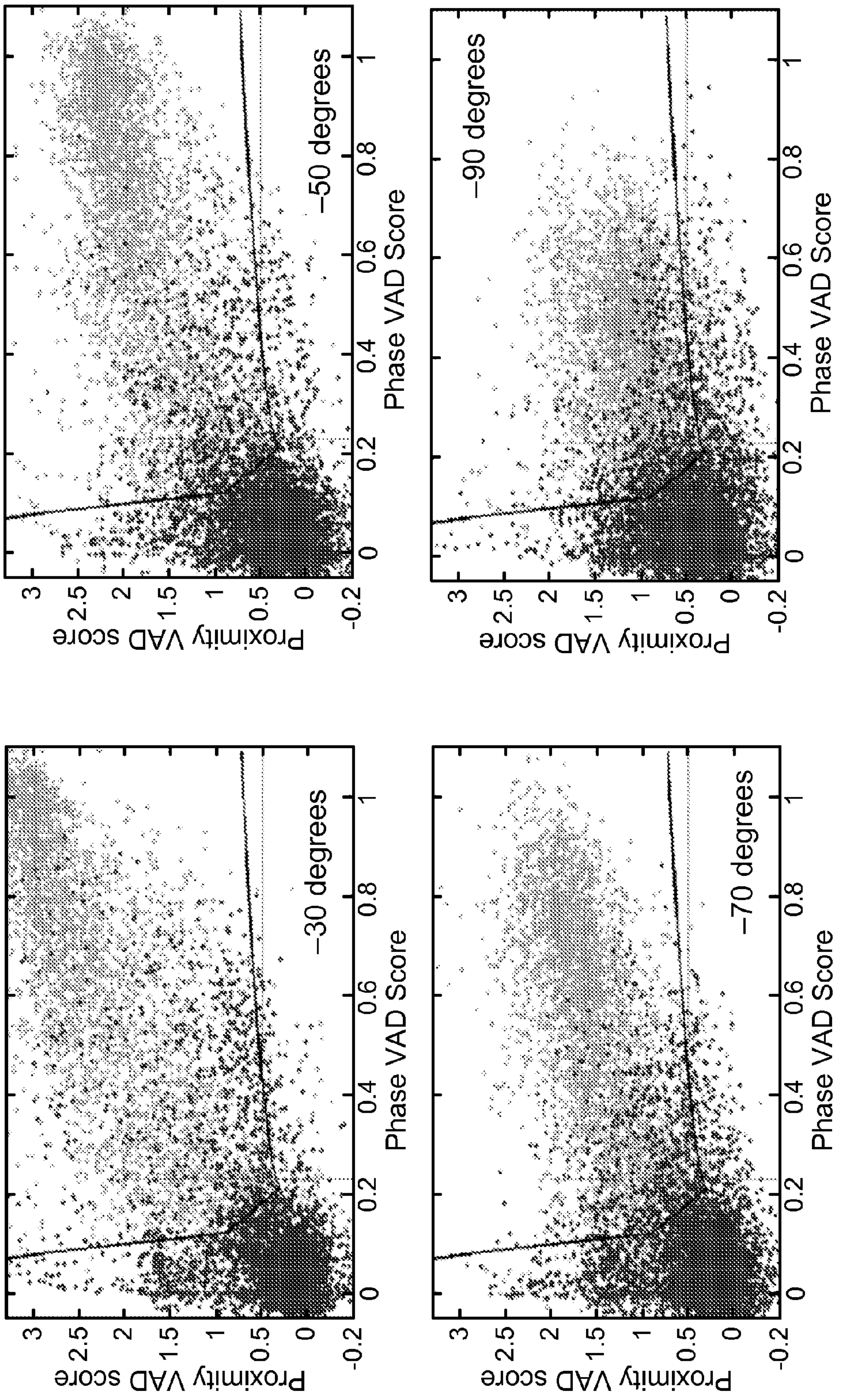
FIG. 16 shows a set of scatter plots.
Figure 17:
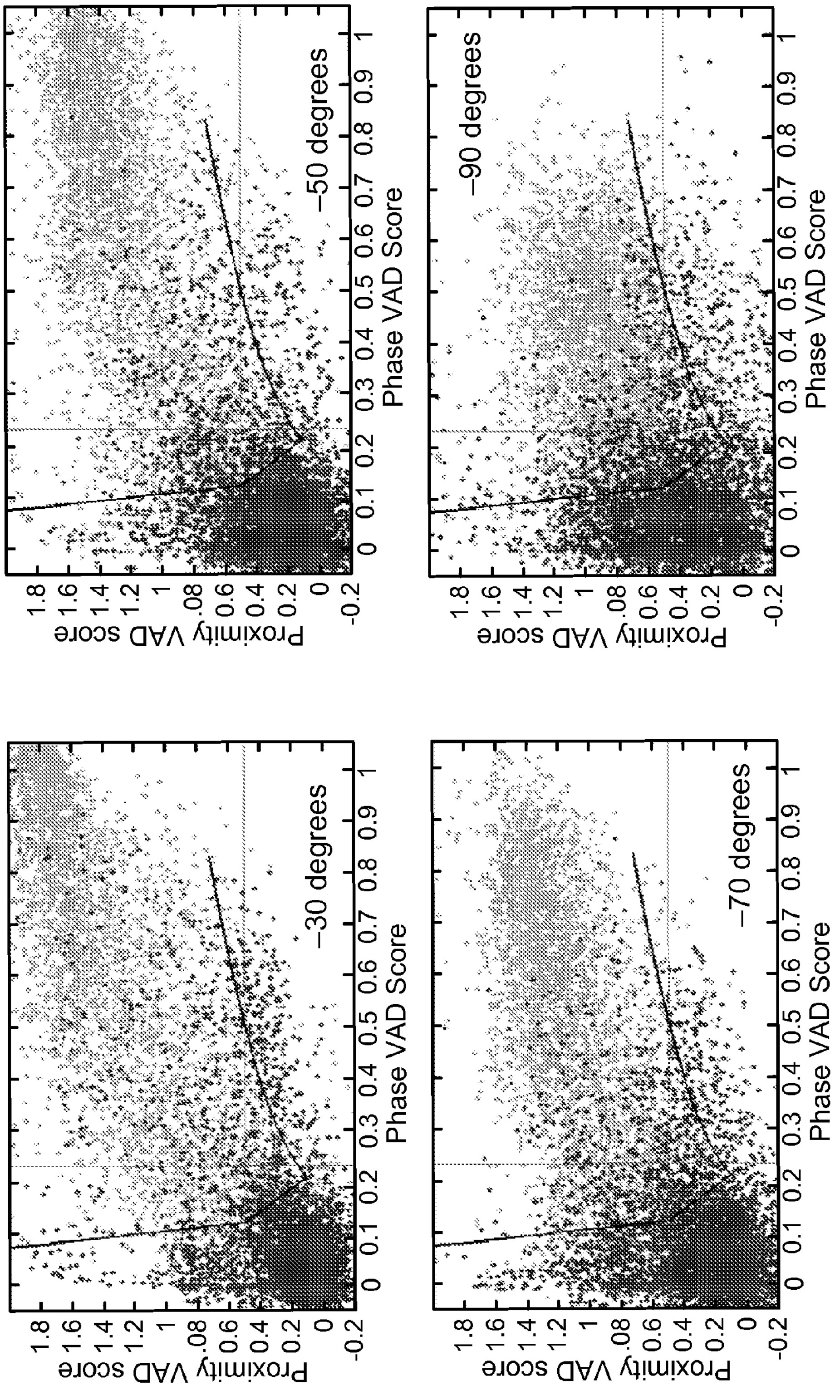
FIG. 17 shows a set of scatter plots.

As shown in FIGS. 15-17, it may be desirable to combine a voice activity decision based on a proximity-based measure with a voice activity decision that is based on a phase-based measure, using an AND operation. The threshold value for one measure may be a function of a corresponding value of another measure.

It may be desirable to combine the decisions of the onset and offset VAD operations with other VAD decisions using an OR operation. It may be desirable to combine the decisions of the low-frequency proximity-based VAD operation with other VAD decisions using an OR operation.

It may be desirable to vary a voice activity measure or corresponding threshold based on the value of another voice activity measure. Onset and/or offset detection may also be used to vary a gain of another VAD signal, such as a magnitude-difference-based measure and/or a phase-difference-based measure. For example, the VAD statistic may be multiplied by a factor greater than one or increased by a bias value greater than zero (before thresholding), in response to onset and/or offset indication. In one such example, a phase-based VAD statistic (e.g., a coherency measure) is multiplied by a factor ph_mult>1, and a gain-based VAD statistic (e.g., a difference between channel levels) is multiplied by a factor pd_mult>1, if onset detection or offset detection is indicated for the segment. Examples of values for ph_mult include 2, 3, 3.5, 3.8, 4, and 4.5. Examples of values for pd_mult include 1.2, 1.5, 1.7, and 2.0. Alternatively, one or more such statistics may be attenuated (e.g., multiplied by a factor less than one), in response to a lack of onset and/or offset detection in the segment. In general, any method of biasing the statistic in response to onset and/or offset detection state may be used (e.g., adding a positive bias value in response to detection or a negative bias value in response to lack of detection, raising or lowering a threshold value for the test statistic according to the onset and/or offset detection, and/or otherwise modifying a relation between the test statistic and the corresponding threshold).

It may be desirable for the final VAD decision to include results from a single-channel VAD operation (e.g., comparison of frame energy of a primary microphone channel to an average frame energy). In such case, it may be desirable to combine the decisions of the single-channel VAD operation with other VAD decisions using an OR operation. In another example, a VAD decision that is based on differences between channels is combined with the value (single-channel VAD || onset VAD || offset VAD) using an AND operation.

By combining voice activity measures that are based on different features of the signal (e.g., proximity, direction of arrival, onset/offset, SNR), a fairly good frame-by-frame VAD can be obtained. Because every VAD has false alarms and misses, it may be risky to suppress the signal if the final combined VAD indicates there is no speech. But if the suppression is performed only if all the VADs including single-channel VAD, proximity VAD, phase-based VAD, and onset/offset VAD indicates there is no speech, it may be expected to be reasonably safe. A proposed module T120 as shown in the block diagram of FIG. 21B suppresses the final output signal T120A when all the VADs indicate there is no speech, with appropriate smoothing T120B (e.g., temporal smoothing of the gain factor).

Figure 12:
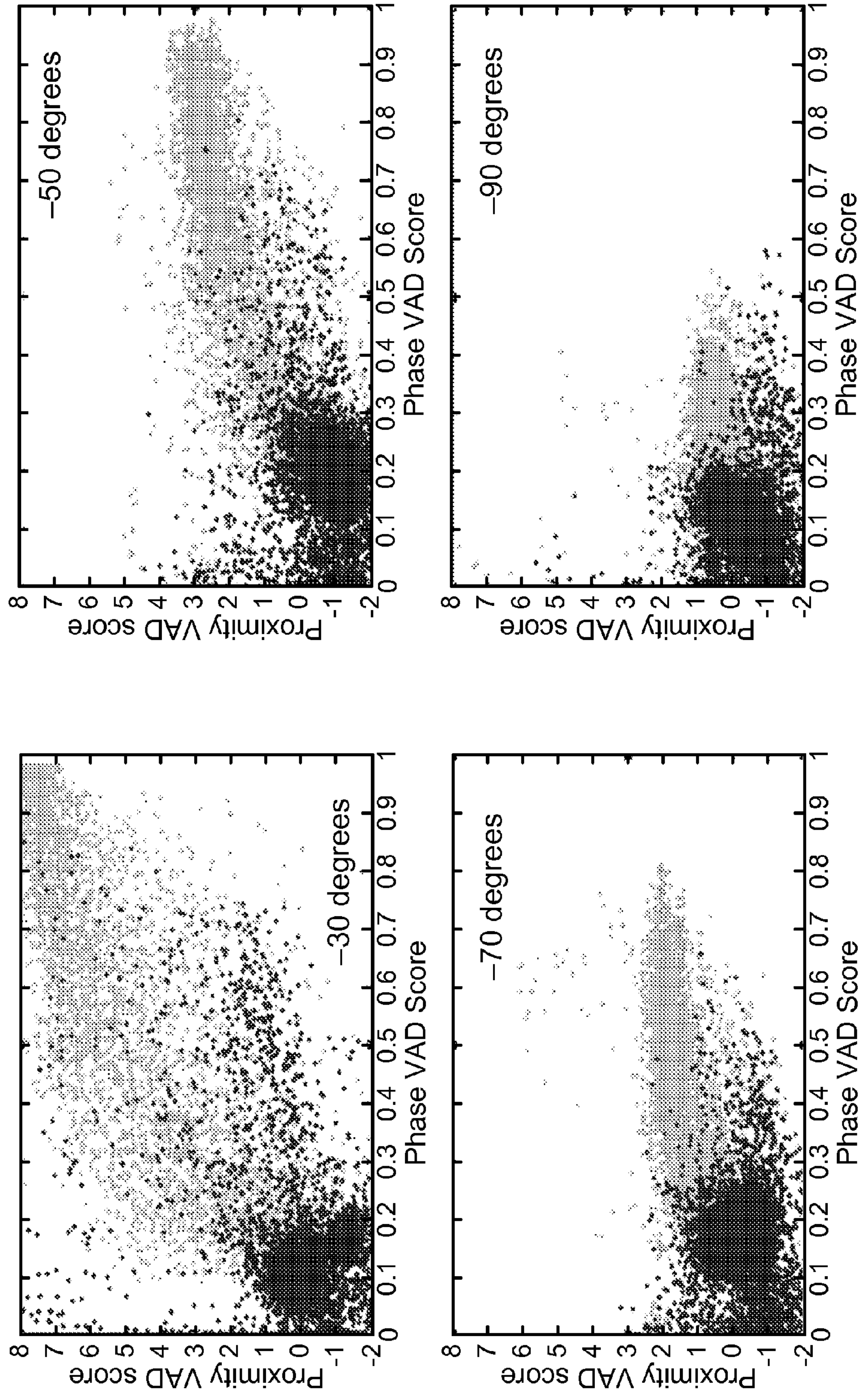
FIG. 12 shows scatter plots of proximity-based VAD test statistics vs. phase difference-based VAD test statistics.

FIG. 12 shows scatter plots of proximity-based VAD test statistics vs. phase difference-based VAD test statistics for 6 dB SNR with holding angles of −30, −50, −70, and −90 degrees from the horizontal. For the phase-difference-based VAD, the test statistic used in this example is the average number of frequency bins with the estimated DoA in the range of look direction (e.g., within +/−ten degrees), and for magnitude-difference-based VAD, the test statistic used in this example is the log RMS level difference between the primary and the secondary microphones. The gray dots correspond to speech-active frames, while the black dots correspond to speech-inactive frames.

Although dual-channel VADs are in general more accurate than single-channel techniques, they are typically highly dependent on the microphone gain mismatch and/or the angle at which the user is holding the phone. From FIG. 12, it may be understood that a fixed threshold may not be suitable for different holding angles. One approach to dealing with a variable holding angle is to detect the holding angle (for example, using direction of arrival (DoA) estimation, which may be based on phase difference or time-difference-of-arrival (TDOA), and/or gain difference between microphones). An approach that is based on gain differences, however, may be sensitive to differences between the gain responses of the microphones.

Another approach to dealing with a variable holding angle is to normalize the voice activity measures. Such an approach may be implemented to have the effect of making the VAD threshold a function of statistics that are related to the holding angle, without explicitly estimating the holding angle.

For offline processing, it may be desirable to obtain a suitable threshold by using a histogram. Specifically, by modeling the distribution of a voice activity measure as two Gaussians, a threshold value can be computed. But for real-time online processing, the histogram is typically inaccessible, and estimation of the histogram is often unreliable.

Figure 8A:
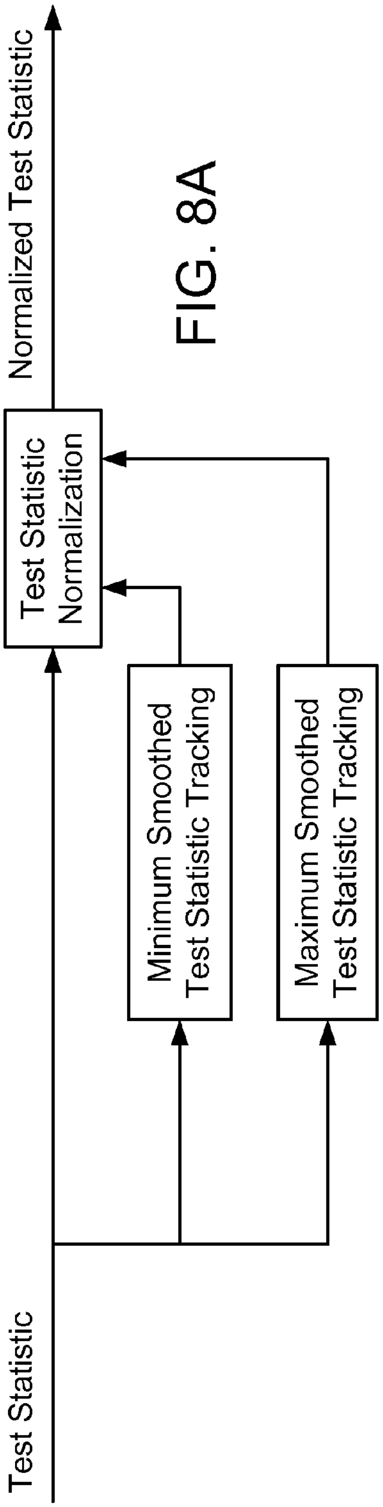
FIG. 8A shows a conceptual diagram of a normalization scheme.

For online processing, a minimum statistics-based approach may be utilized. Normalization of the voice activity measures based on maximum and minimum statistics tracking may be used to maximize discrimination power, even for situations in which the holding angle varies and the gain responses of the microphones are not well-matched. FIG. 8A shows a conceptual diagram of such a normalization scheme.

Figure 8B:
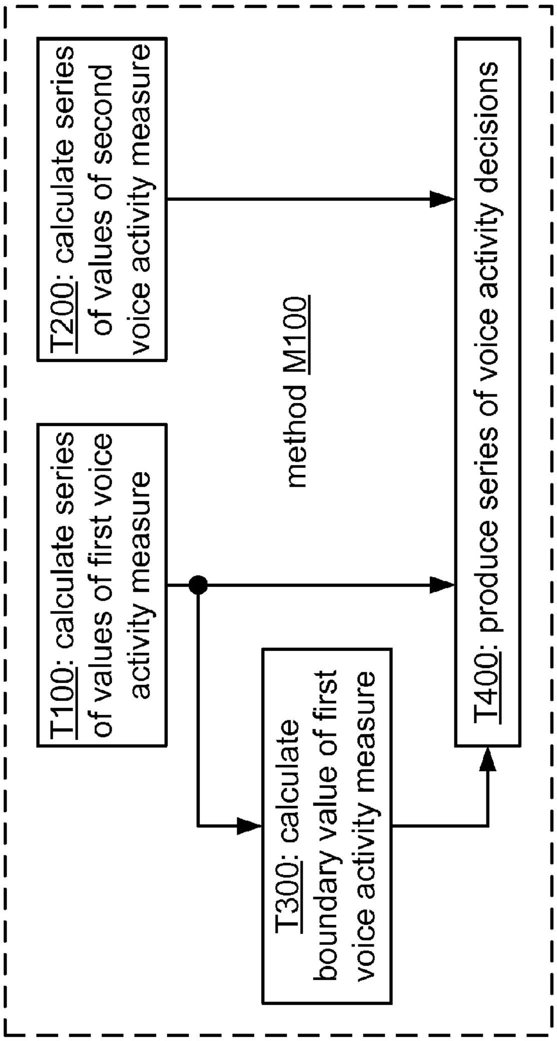
FIG. 8B shows a flowchart of a method M100 of processing an audio signal according to a general configuration.

FIG. 8B shows a flowchart of a method M100 of processing an audio signal according to a general configuration that includes tasks T100, T200, T300, and T400. Based on information from a first plurality of frames of the audio signal, task T100 calculates a series of values of a first voice activity measure. Based on information from a second plurality of frames of the audio signal, task T200 calculates a series of values of a second voice activity measure that is different from the first voice activity measure. Based on the series of values of the first voice activity measure, task T300 calculates a boundary value of the first voice activity measure. Based on the series of values of the first voice activity measure, the series of values of the second voice activity measure, and the calculated boundary value of the first voice activity measure, task T400 produces a series of combined voice activity decisions.

Task T100 may be configured to calculate the series of values of the first voice activity measure based on a relation between channels of the audio signal. For example, the first voice activity measure may be a phase-difference-based measure as described herein.

Likewise, task T200 may be configured to calculate the series of values of the second voice activity measure based on a relation between channels of the audio signal. For example, the second voice activity measure may be a magnitude-difference-based measure or a low-frequency proximity-based measure as described herein. Alternatively, task T200 may be configured to calculate the series of values of the second voice activity measure based on detection of speech onsets and/or offsets as described herein.

Task T300 may be configured to calculate the boundary value as a maximum value and/or as a minimum value. It may be desirable to implement task T300 to perform minimum tracking as in a minimum statistics algorithm. Such an implementation may include smoothing the voice activity measure, such as first-order IIR smoothing. The minimum of the smoothed measure may be selected from a rolling buffer of length D. For example, it may be desirable to maintain a buffer of D past voice activity measure values, and to track the minimum in this buffer. It may be desirable for the length D of the search window D to be large enough to include non-speech regions (i.e. to bridge active regions) but small enough to allow the detector to respond to nonstationary behavior. In another implementation, the minimum value may be calculated from minima of U sub-windows of length V (where U×V=D). In accordance with the minimum statistics algorithm, it may also be desirable to use a bias compensation factor to weight the boundary value.

As noted above, it may be desirable to use an implementation of the well-known minimum-statistics noise power spectrum estimation algorithm for minimum and maximum smoothed test-statistic tracking. For maximum test-statistic tracking, it may be desirable to use the same minimum-tracking algorithm. In this case, an input suitable for the algorithm may be obtained by subtracting the value of the voice activity measure from an arbitrary fixed large number. The operation may be reversed at the output of the algorithm to obtain the maximum tracked value.

Task T400 may be configured to compare the series of first and second voice activity measures to corresponding thresholds and to combine the resulting voice activity decisions to produce the series of combined voice activity decisions. Task T400 may be configured to warp the test statistics to make a minimum smoothed statistic value of zero and a maximum smoothed statistic value of one according to an expression such as the following:

$$s'_t = \frac{s_t - s_{min}}{s_{MAX} - s_{min}} \gtrless \xi \tag{5}$$

where $s_t$ denotes the input test statistic, $s_t'$ denotes the normalized test statistic, $s_{min}$ denotes the tracked minimum smoothed test statistic, $s_{MAX}$ denotes the tracked maximum smoothed test statistic, and $\xi$ denotes the original (fixed) threshold. It is noted that the normalized test statistic $s_t'$ may have a value outside of the [0, 1] range due to the smoothing.

It is expressly contemplated and hereby disclosed that task T400 may be also be configured to implement the decision rule shown in expression (5) equivalently using the unnormalized test statistic $s_t$ with an adaptive threshold as follows:

$$s_t \gtrless [\xi\square=(s_{MAX}-s_{min})\xi+s_{min}] \tag{6}$$

where $(s_{MAX}-s_{min})\xi+s_{min}$ denotes an adaptive threshold $\xi\square$ that is equivalent to using a fixed threshold $\xi$ with the normalized test statistic $s_t'$.

Figure 9A:
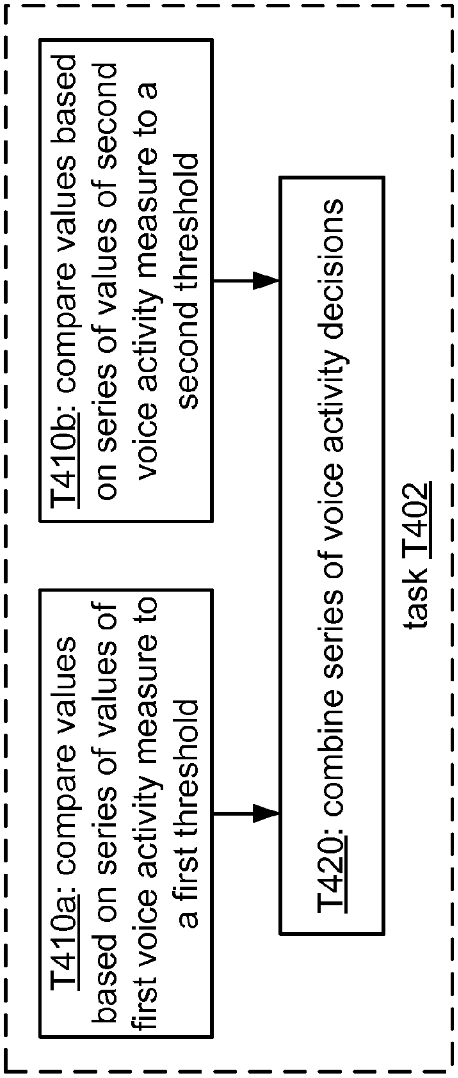
FIG. 9A shows a flowchart of an implementation T402 of task T400.

FIG. 9A shows a flowchart of an implementation T402 of task T400 that includes tasks T410*a*, T410*b*, and T420. Task T410*a* compares each of a first set of values to a first threshold to obtain a first series of voice activity decisions, task T410*b* compares each of a second set of values to a second threshold to obtain a second series of voice activity decisions, and task T420 combines the first and second series of voice activity decisions to produce the series of combined voice activity decisions (e.g., according to any of the logical combination schemes described herein).

Figure 9B:
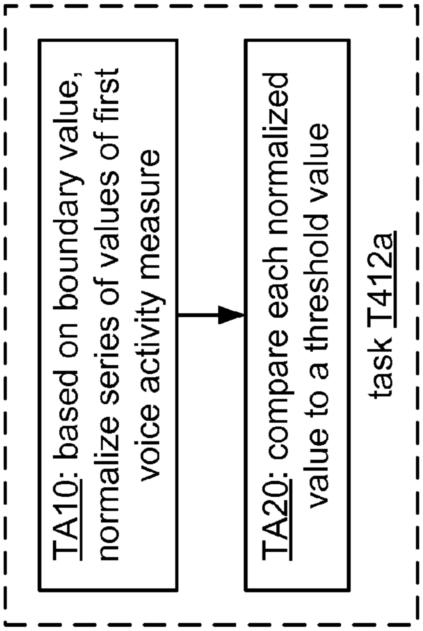
FIG. 9B shows a flowchart of an implementation T412*a* of task T410*a*.

FIG. 9B shows a flowchart of an implementation T412*a* of task T410*a* that includes tasks TA10 and TA20. Task TA10 obtains the first set of values by normalizing the series of values of the first voice activity measure according to the boundary value calculated by task T300 (e.g., according to expression (5) above). Task TA20 obtains the first series of voice activity decisions by comparing each of the first set of values to a threshold value. Task T410*b* may be similarly implemented.

Figure 9C:
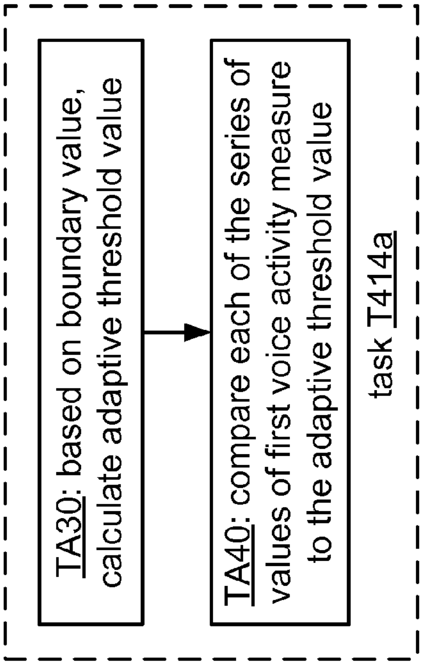
FIG. 9C shows a flowchart of an alternate implementation T414*a* of task T410*a*.

FIG. 9C shows a flowchart of an alternate implementation T414*a* of task T410*a* that includes tasks TA30 and TA40. Task TA30 calculates an adaptive threshold value that is based on the boundary value calculated by task T300 (e.g., according to expression (6) above). Task TA40 obtains the first series of voice activity decisions by comparing each of the series of values of the first voice activity measure to the adaptive threshold value. Task T410*b* may be similarly implemented.

Although a phase-difference-based VAD is typically immune to differences in the gain responses of the microphones, a magnitude-difference-based VAD is typically highly sensitive to such a mismatch. A potential additional benefit of this scheme is that the normalized test statistic $s_t'$ is independent of microphone gain calibration. Such an approach may also reduce sensitivity of a gain-based measure to microphone gain response mismatch. For example, if the gain response of the secondary microphone is 1 dB higher than normal, then the current test statistic $s_t$, as well as the maximum statistic $s_{MAX}$ and the minimum statistic $s_{min}$, will be 1 dB lower. Therefore, the normalized test statistic $s_t'$ will be the same.

Figure 13:
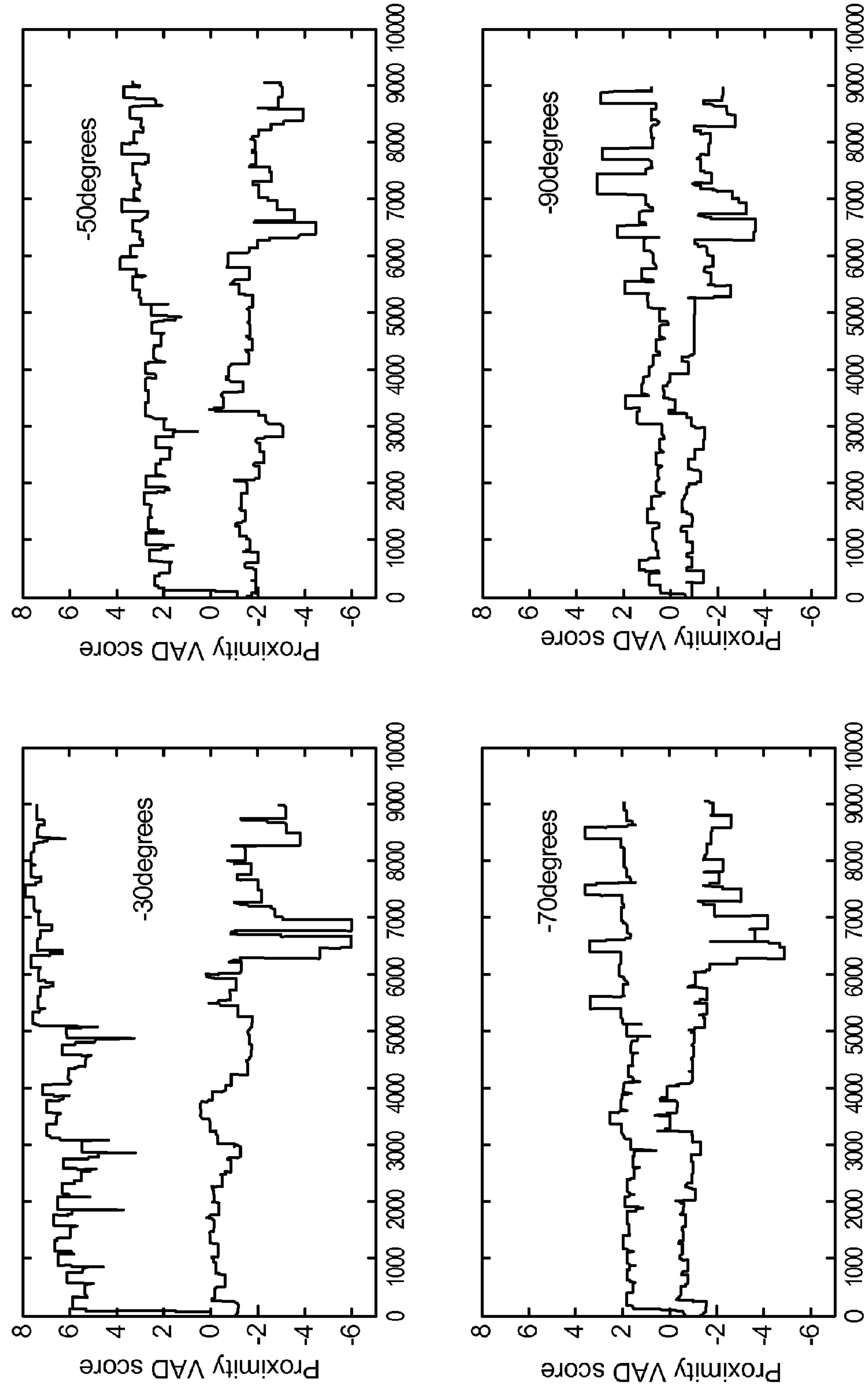
FIG. 13 shows tracked minimum and maximum test statistics for proximity-based VAD test statistics.
Figure 14:
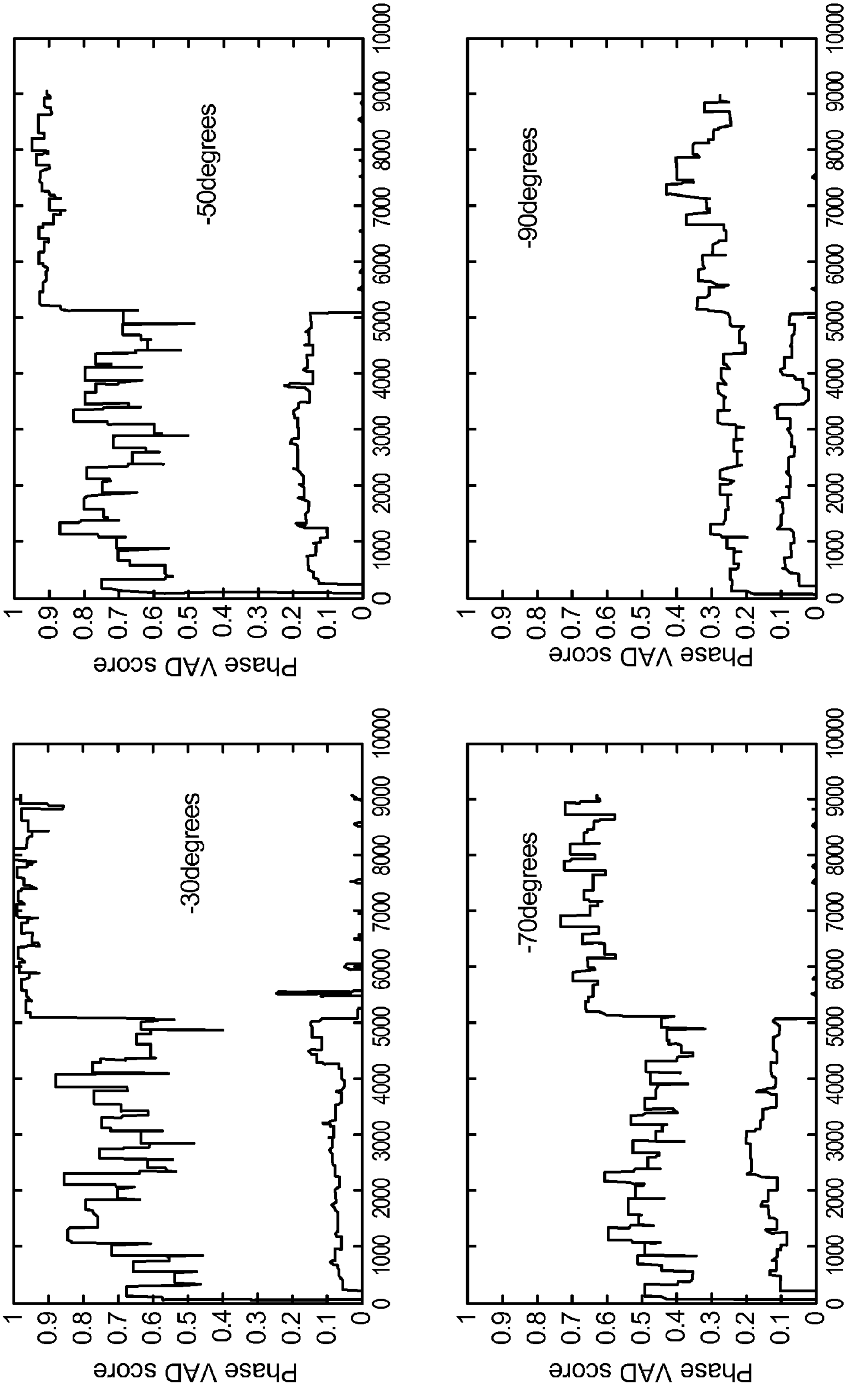
FIG. 14 shows tracked minimum and maximum test statistics for phase-based VAD test statistics.

FIG. 13 shows the tracked minimum (black, lower trace) and maximum (gray, upper trace) test statistics for proximity-based VAD test statistics for 6 dB SNR with holding angles of −30, −50, −70, and −90 degrees from the horizontal. FIG. 14 shows the tracked minimum (black, lower trace) and maximum (gray, upper trace) test statistics for phase-based VAD test statistics for 6 B SNR with holding angles of −30, −50, −70, and −90 degrees from the horizontal. FIG. 15 shows scatter plots for the test statistics normalized according to equation (5). The two gray lines and the three black lines in each plot indicate possible suggestions for two different VAD thresholds (the right upper side of all the lines with one color is considered to be speech-active frames), which are set to be the same for all four holding angles. For convenience, these lines are shown in isolation in FIG. 11B.

One issue with the normalization in equation (5) is that although the whole distribution is well-normalized, the normalized score variance for noise-only intervals (black dots) increases relatively for the cases with narrow unnormalized test statistic range. For example, FIG. 15 shows that the cluster of black dots spreads as the holding angle changes from −30 degrees to −90 degrees. This spread may be controlled in task T400 by using a modification such as the following:

$$s'_t = \frac{s_t - s_{min}}{(s_{MAX} - s_{min})^{1-\alpha}} \gtrless \xi \quad (7)$$

or, equivalently, $$s_t \gtrless (s_{MAX} - s_{min})^{1-\alpha}\xi + s_{min} \quad (8)$$

where $0 \le \alpha \le 1$ is a parameter controlling a trade-off between normalizing the score and inhibiting an increase in the variance of the noise statistics. It is noted that the normalized statistic in expression (7) is also independent of microphone gain variation, since $s_{MAX}-s_{min}$ will be independent of microphone gains.

For a value of $\alpha=0$, expressions (7) and (8) are equivalent to expressions (5) and (6), respectively. Such a distribution is shown in FIG. 15. FIG. 16 shows a set of scatter plots resulting from applying a value of $\alpha=0.5$ for both voice activity measures. FIG. 17 shows a set of scatter plots resulting from applying a value of $\alpha=0.5$ for the phase VAD statistic and a value of $\alpha=0.25$ for the proximity VAD statistic. These figures show that using a fixed threshold with such a scheme can result in reasonably robust performance for various holding angles.

The table in FIG. 18 shows the average false alarm probability (P_fa) and the probability of miss (P_miss) of the combination of phase and proximity VAD for 6 dB and 12 dB SNR cases with pink, babble, car, and competing talker noises for four different holding angles, with $\alpha=0.25$ for the proximity-based measure and $\alpha=0.5$ for the phase-based measure, respectively. The robustness to variations in the holding angle is verified once more.

Figure 10A:
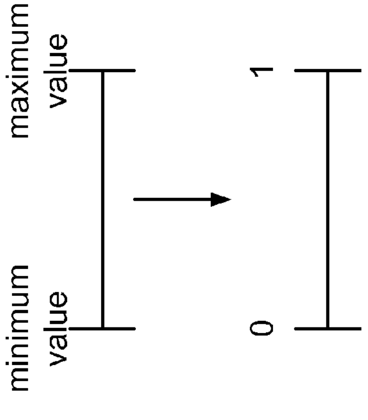
FIGS. 10A-10C show mappings.
Figure 10B:
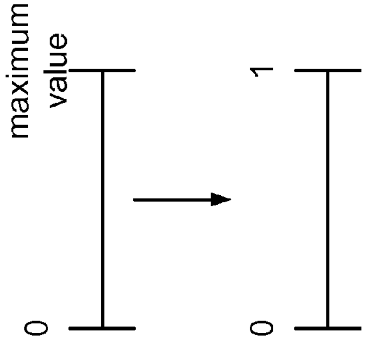
Figure 10C:
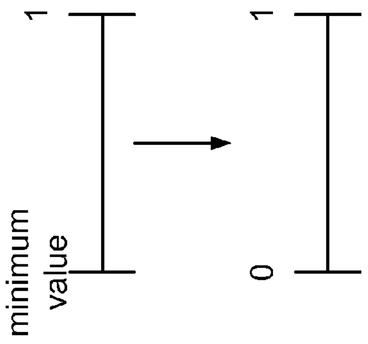

As described above, a tracked minimum value and a tracked maximum value may be used to map a series of values of a voice activity measure to the range [0, 1] (with allowance for smoothing). FIG. 10A illustrates such a mapping. In some cases, however, it may be desirable to track only one boundary value and to fix the other boundary. FIG. 10B shows an example in which the maximum value is tracked and the minimum value is fixed at zero. It may be desirable to configure task T400 to apply such a mapping, for example, to a series of values of a phase-based voice activity measure (e.g., to avoid problems from sustained voice activity that may cause the minimum value to become too high). FIG. 10C shows an alternate example in which the minimum value is tracked and the maximum value is fixed at one.

Task T400 may also be configured to normalize a voice activity measure based on speech onset and/or offset (e.g., as in expression (5) or (7) above). Alternatively, task T400 may be configured to adapt a threshold value corresponding to the number of frequency bands that are activated (i.e., that show a sharp increase or decrease in energy), such as according to expression (6) or (8) above.

For onset/offset detection, it may be desirable to track the maximum and minimum of the square of ΔE(k,n) (e.g., to track only positive values), where ΔE(k,n) denotes the time-derivative of energy for frequency k and frame n. It may also be desirable to track the maximum as the square of a clipped value of ΔE(k,n) (e.g., as the square of max[0, ΔE(k,n)] for onset and the square of min[0, ΔE(k,n)] for offset). While negative values of ΔE(k,n) for onset and positive values of ΔE(k,n) for offset may be useful for tracking noise fluctuation in minimum statistic tracking, they may be less useful in maximum statistic tracking. It may be expected that the maximum of onset/offset statistics will decrease slowly and rise rapidly.

Figure 10D:
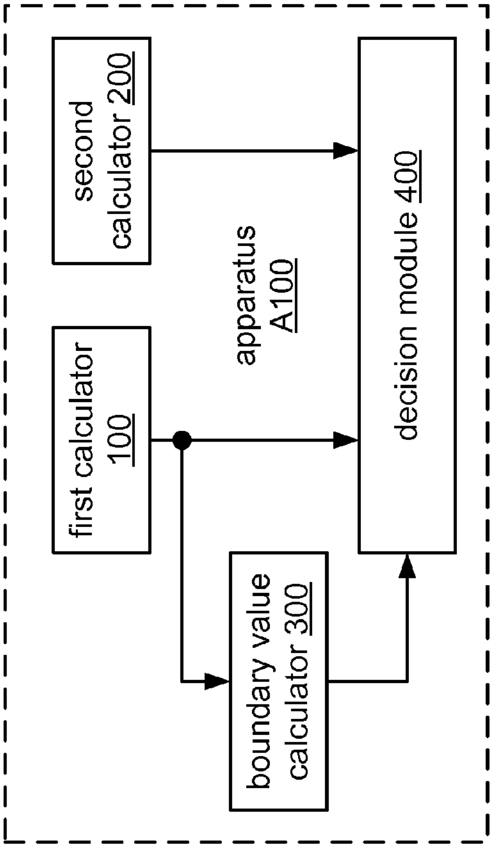
FIG. 10D shows a block diagram of an apparatus A100 according to a general configuration.

FIG. 10D shows a block diagram of an apparatus A100 according to a general configuration that includes a first calculator 100, a second calculator 200, a boundary value calculator 300, and a decision module 400. First calculator 100 is configured to calculate a series of values of a first voice activity measure, based on information from a first plurality of frames of the audio signal (e.g., as described herein with reference to task T100). First calculator 100 is configured to calculate a series of values of a second voice activity measure that is different from the first voice activity measure, based on information from a second plurality of frames of the audio signal (e.g., as described herein with reference to task T200). Boundary value calculator 300 is configured to calculate a boundary value of the first voice activity measure, based on the series of values of the first voice activity measure (e.g., as described herein with reference to task T300). Decision module 400 is configured to produce a series of combined voice activity decisions, based on the series of values of the first voice activity measure, the series of values of the second voice activity measure, and the calculated boundary value of the first voice activity measure (e.g., as described herein with reference to task T400).

Figure 11A:
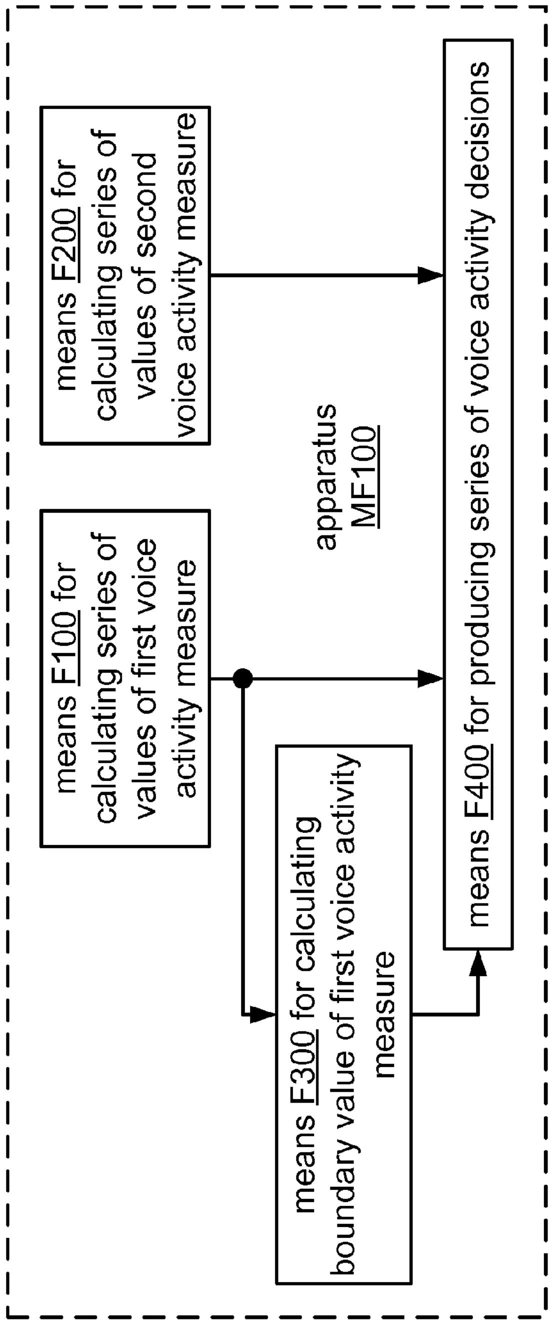
FIG. 11A shows a block diagram of an apparatus MF100 according to another general configuration.
Figure 11B:
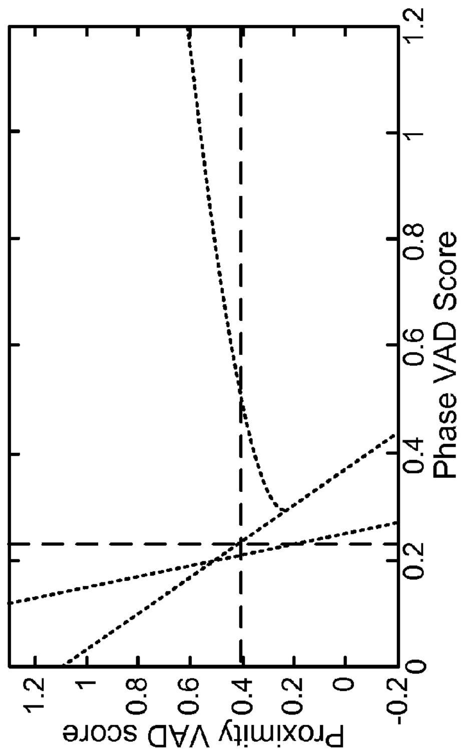
FIG. 11B shows the threshold lines of FIG. 15 in isolation.

FIG. 11A shows a block diagram of an apparatus MF100 according to another general configuration. Apparatus MF100 includes means F100 for calculating a series of values of a first voice activity measure, based on information from a first plurality of frames of the audio signal (e.g., as described herein with reference to task T100). Apparatus MF100 also includes means F200 for calculating a series of values of a second voice activity measure that is different from the first voice activity measure, based on information from a second plurality of frames of the audio signal (e.g., as described herein with reference to task T200). Apparatus MF100 also includes means F300 for calculating a boundary value of the first voice activity measure, based on the series of values of the first voice activity measure (e.g., as described herein with reference to task T300). Apparatus MF100 includes means F400 for producing a series of combined voice activity decisions, based on the series of values of the first voice activity measure, the series of values of the second voice activity measure, and the calculated boundary value of the first voice activity measure (e.g., as described herein with reference to task T400).

It may be desirable for a speech processing system to intelligently combine estimation of non-stationary noise and estimation of stationary noise. Such a feature may help the system to avoid introducing artifacts, such as voice attenuation and/or musical noise. Examples of logic schemes for combining noise references (e.g., for combining estimates of stationary and nonstationary noise) are described below.

A method of reducing noise in a multichannel audio signal may include producing a combined noise estimate as a linear combination of at least one estimate of stationary noise within the multichannel signal and at least one estimate of nonstationary noise within the multichannel signal. If we denote the weight for each noise estimate $N_i[n]$ as $W_i[n]$, for example, the combined noise reference can be expressed as a linear combination $\Sigma W_i[n]*N_i[n]$ of weighted noise estimates, where $\Sigma W_i[n]\equiv 1$. The weights may be dependent on the decision between single- and dual-microphone modes, based on DoA estimation and the statistics on the input signal (e.g., normalized phase coherency measure). For example, it may be desirable to set the weight for a nonstationary noise reference which is based on spatial processing to zero for single-microphone mode. As for another example, it may be desirable for the weight for a VAD-based long-term noise estimate and/or nonstationary noise estimate to be higher for speech-inactive frames where the normalized phase coherency measure is low, because such estimates tend to be more reliable for speech-inactive frames.

It may be desirable in such a method for at least one of said weights to be based on an estimated direction of arrival of the multichannel signal. Additionally or alternatively, it may be desirable in such a method for the linear combination to be a linear combination of weighted noise estimates, and for at least one of said weights to be based on a phase coherency measure of the multichannel signal. Additionally or alternatively, it may be desirable in such a method to nonlinearly combine the combined noise estimate with a masked version of at least one channel of the multichannel signal.

Figure 19:
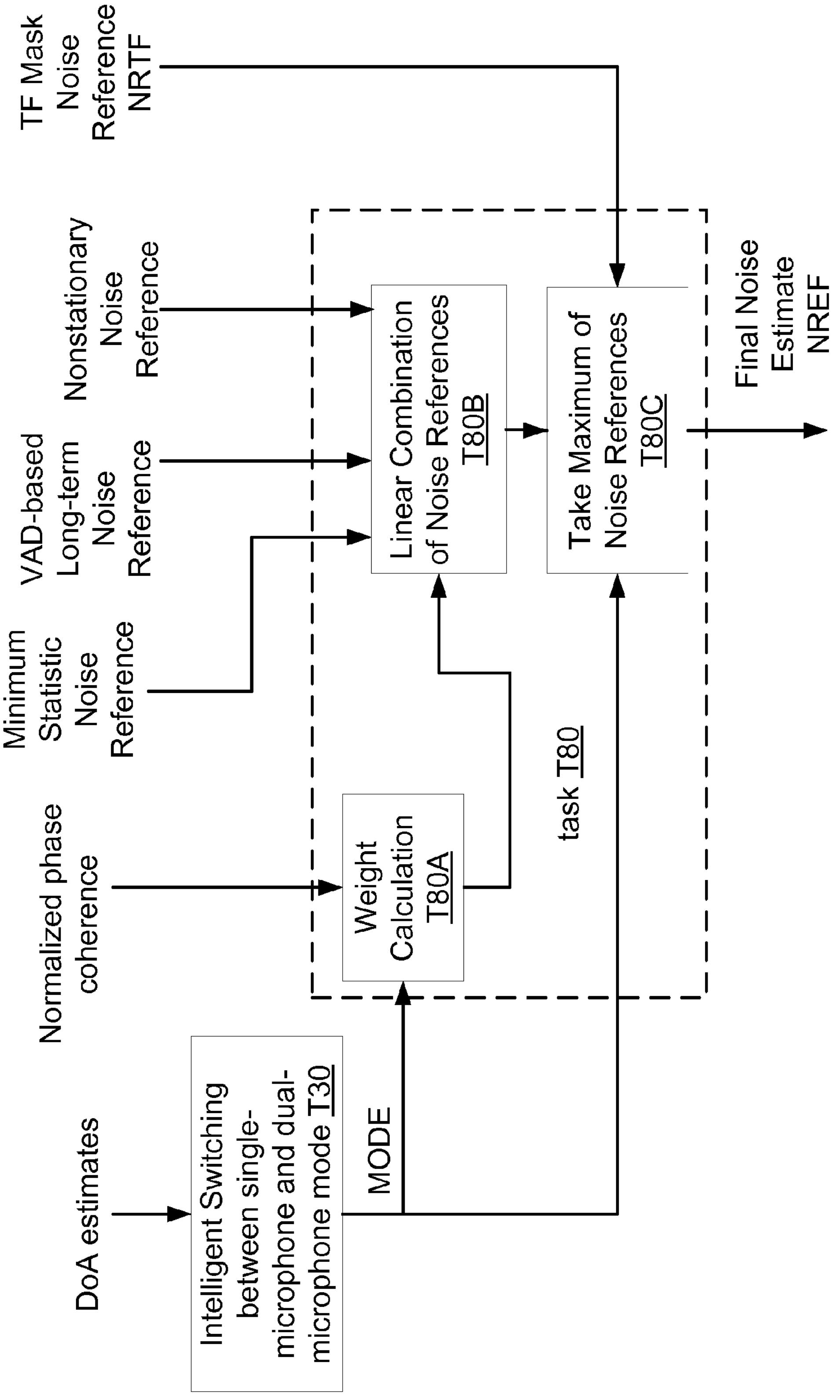
FIG. 19 shows a block diagram of task T80.

One or more other noise estimates may then be combined with the previously obtained noise reference through a maximum operation T80C. For example, a time-frequency (TF) mask-based noise reference $NR_{TF}$ may be calculated by multiplying the inverse of the TF VAD with the input signal according to an expression such as:

$$NR_{TF}[n,k]=(1-TF\_VAD[n,k])*s[n,k],$$

where s denotes the input signal, n denotes a time (e.g., frame) index, and k denotes a frequency (e.g., bin or subband) index. That is, if time frequency VAD is 1 for that time-frequency cell [n,k], the TF mask noise reference for the cell is 0; otherwise, it is the TF mask noise reference for the cell is the input cell itself. It may be desirable for such a TF mask noise reference to be combined with the other noise references through a maximum operation T80C rather than a linear combination. FIG. 19 shows an exemplary block diagram of such a task T80.

A conventional dual-microphone noise reference system typically includes a spatial filtering stage followed by a post-processing stage. Such post-processing may include a spectral subtraction operation that subtracts a noise estimate as described herein (e.g., a combined noise estimate) from noisy speech frames in the frequency domain to produce a speech signal. In another example, such post-processing includes a Wiener filtering operation that reduces noise in the noisy speech frames, based on a noise estimate as described herein (e.g., a combined noise estimate), to produce the speech signal.

If more aggressive noise suppression is required, one can consider additional residual noise suppression based on time-frequency analysis and/or accurate VAD information. For example, a residual noise suppression method may be based on proximity information (e.g., inter-microphone magnitude difference) for each time-frequency cell, based on phase difference for each time-frequency cell, and/or based on frame-by-frame VAD information.

Figure 20A:
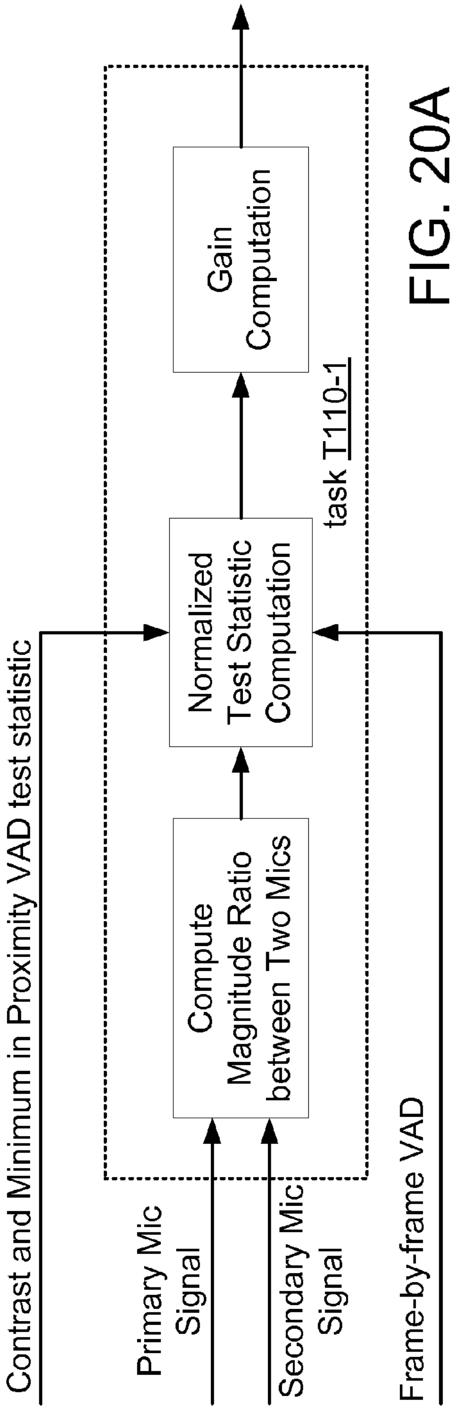
FIG. 20A shows a block diagram of gain computation T110-1.

A residual noise suppression based on magnitude difference between two microphones may include a gain function based on the threshold and TF gain difference. Such a method is related to time-frequency (TF) gain-difference-based VAD, although it utilizes a soft decision rather than a hard decision. FIG. 20A shows a block diagram of this gain computation T110-1.

It may be desirable to perform a method of reducing noise in a multichannel audio signal that includes calculating a plurality of gain factors, each based on a difference between two channels of the multichannel signal in a corresponding frequency component; and applying each of the calculated gain factors to the corresponding frequency component of at least one channel of the multichannel signal. Such a method may also include normalizing at least one of the gain factors based on a minimum value of the gain factor over time. Such normalizing may be based on a maximum value of the gain factor over time.

It may be desirable to perform a method of reducing noise in a multichannel audio signal that includes calculating a plurality of gain factors, each based on a power ratio between two channels of the multichannel signal in a corresponding frequency component during clean speech; and applying each of the calculated gain factors to the corresponding frequency component of at least one channel of the multichannel signal. In such a method, each of the gain factors may be based on a power ratio between two channels of the multichannel signal in a corresponding frequency component during noisy speech.

It may be desirable to perform a method of reducing noise in a multichannel audio signal that includes calculating a plurality of gain factors, each based on a relation between a phase difference between two channels of the multichannel signal in a corresponding frequency component and a desired look direction; and applying each of the calculated gain factors to the corresponding frequency component of at least one channel of the multichannel signal. Such a method may include varying the look direction according to a voice-activity-detection signal.

Analogously to the conventional frame-by-frame proximity VAD, the test statistic for TF proximity VAD in this example is the ratio between the magnitudes of two microphone signals in that TF cell. This statistic may then be normalized using the tracked maximum and minimum value of the magnitude ratio (e.g., as shown in equation (5) or (7) above).

If there is not enough computational budget, instead of computing the maximum and minimum for each band, the global maximum and minimum of log RMS level difference between two microphone signals can be used with an offset parameter whose value is dependent on frequency, frame-by-frame VAD decision, and/or holding angle. As for the frame-by-frame VAD decision, it may be desirable to use a higher value of the offset parameter for speech-active frames for a more robust decision. In this way, the information in other frequencies can be utilized.

It may be desirable to use $s_{MAX}-s_{min}$ of the proximity VAD in equation (7) as a representation of the holding angle. Since the high-frequency component of speech is likely to be attenuated more for an optimal holding angle (e.g., −30 degrees from the horizontal) as compared with the low-frequency component, it may be desirable to change the spectral tilt of the offset parameter or threshold according to the holding angle.

With this final test statistic $s_t''$ after normalization and offset addition, TF proximity VAD can be decided by comparing it with the threshold $\xi$. In the residual noise suppression, it may be desirable to adopt a soft decision approach. For example, one possible gain rule is $$G[k]=10^{-\beta(\xi'-s_{t''})}$$

with maximum (1.0) and minimum gain limitation, where $\xi'$ is typically set to be higher than the hard-decision VAD threshold $\xi$. The tuning parameter $\beta$ may be used to control the gain function roll-off, with a value that may depend on the scaling adopted for the test statistic and threshold.

Additionally or alternatively, a residual noise suppression based on magnitude difference between two microphones may include a gain function based on the TF gain difference for input signal and that of clean speech. While a gain function based on the threshold and TF gain difference as described in the previous section has its rational, the resulting gain may not be optimal in any sense. We propose an alternative gain function that is based on the assumptions that the ratio of the clean speech power in the primary and secondary microphones in each band would be the same and that the noise is diffused. This method does not directly estimate noise power, but only deals with the power ratio between two microphones of the input signal and that of the clean speech.

We denote the clean speech signal DFT coefficient in the primary microphone signal and in the secondary microphone signal as X1[k] and X2[k], respectively, where k is a frequency bin index. For a clean speech signal, the test statistic for TF proximity VAD is 20 log|X1[k]|−20 log|X2[k]|. For a given form factor, this test statistic is almost constant for each frequency bin. We express this statistic as 10 log f[k], where f[k] may be computed from the clean speech data.

We assume that time difference of arrival may be ignored, as this difference would typically be much less than the frame size. For a noisy speech signal Y, assuming that the noise is diffuse, we may express the primary and secondary microphone signals as Y1[k]=X1[k]+N[k] and Y2[k]=X2[k]+N[k], respectively. In this case the test statistic for TF proximity VAD is 20 log|Y1[k]|−20 log|Y2[k]|, or 10 log g[k], which can be measured. We assume that the noise is uncorrelated with the signals, and use the principle that the power of the sum of two uncorrelated signals is equal in general to the sum of the powers, to summarize these relations as follows:

$$10\log f[k] = 10\log\frac{|X1[k]|^2}{|X2[k]|^2};$$

$$10\log g[k] = 10\log\frac{|Y1[k]|^2}{|Y2[k]|^2} = 10\log\frac{|X1[k]|^2 + |N[k]|^2}{|X2[k]|^2 + |N[k]|^2}.$$

Using the expressions above, we may obtain relations between powers of X1 and X2 and N, f, and g as follows:

$$|X2[k]|^2 = \frac{|X1[k]|^2}{f[k]};$$

$$|X2[k]| + |N[k]|^2 = \frac{|X1[k]|^2}{f[k]} + |N[k]|^2 = \frac{|X1[k]|^2 + |N[k]|^2}{g[k]};$$

$$\frac{\frac{|X1[k]|^2}{|N[k]|^2}}{f[k]} + 1 = \frac{\frac{|X1[k]|^2}{|N[k]|^2} + 1}{g[k]};$$

$$SNR^2 = \frac{|X1[k]|^2}{|N[k]|^2} = \frac{(g[k]-1)f[k]}{f[k]-g[k]},$$

where in practice the value of g[k] is limited to be higher than or equal to 1.0 and lower than or equal to f[k]. Then the gain applied to the primary microphone signal becomes $$G[k] = \frac{|X1[k]|}{|Y1[k]|} = \frac{SNR}{1+SNR}.$$

Figure 20B:
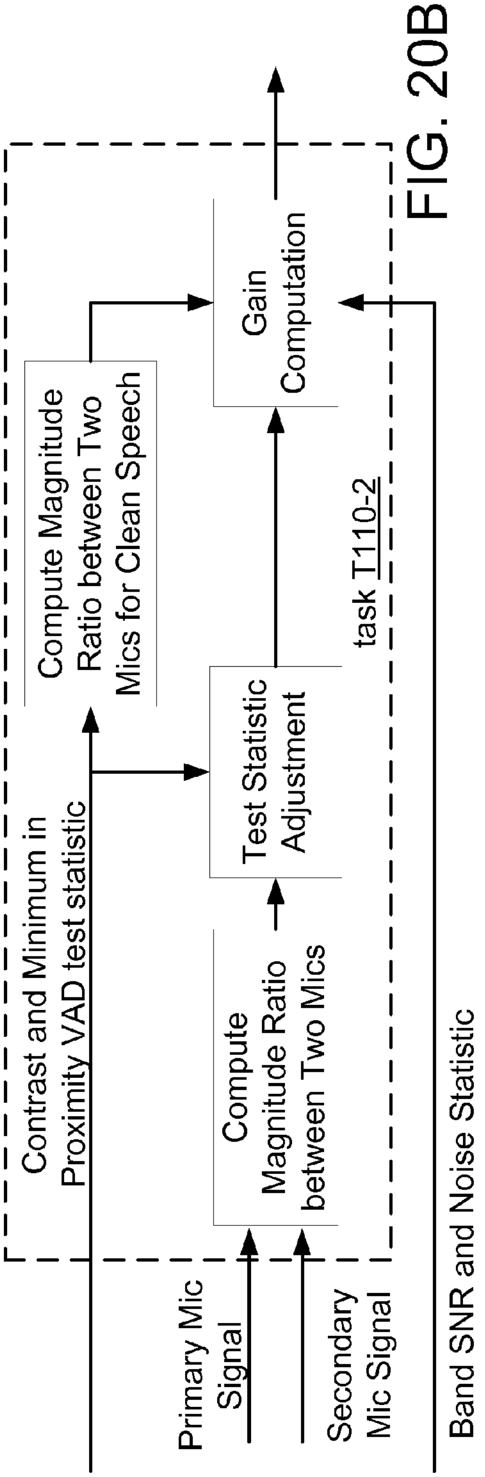
FIG. 20B shows an overall block diagram of a suppression scheme T110-2.

For the implementation, the value of parameter f[k] is likely to depend on the holding angle. Also, it may be desirable to use the minimum value of the proximity VAD test statistic to adjust g[k] (e.g., to cope with the microphone gain calibration mismatch). Also, it may be desirable to limit the gain G[k] to be higher than a certain minimum value which may be dependent on band SNR, frequency, and/or noise statistic. Note that this gain G[k] should be wisely combined with other processing gains, such as spatial filtering and post-processing. FIG. 20B shows an overall block diagram of such a suppression scheme T110-2.

Additionally or alternatively, a residual noise suppression scheme may be based on time-frequency phase-based VAD. Time-frequency phase VAD is calculated from the direction of arrival (DoA) estimation for each TF cell, along with the frame-by-frame VAD information and holding angle. DoA is estimated from the phase difference between two microphone signals in that band. If the observed phase difference indicates that the cos(DoA) value is out of [−1, 1] range, it is considered to be a missing observation. In this case, it may be desirable for the decision in that TF cell to follow the frame-by-frame VAD. Otherwise, the estimated DoA is examined if it is in the look direction range, and an appropriate gain is applied according to a relation (e.g., a comparison) between the look direction range and the estimated DoA.

It may be desirable to adjust the look direction according to frame-by-frame VAD information and/or estimated holding angle. For example, it may be desirable to use a wider look direction range when the VAD indicates active speech. Also, it may be desirable to use a wider look direction range when the maximum phase VAD test statistic is small (e.g., to allow more signal since the holding angle is not optimal).

Figure 21A:
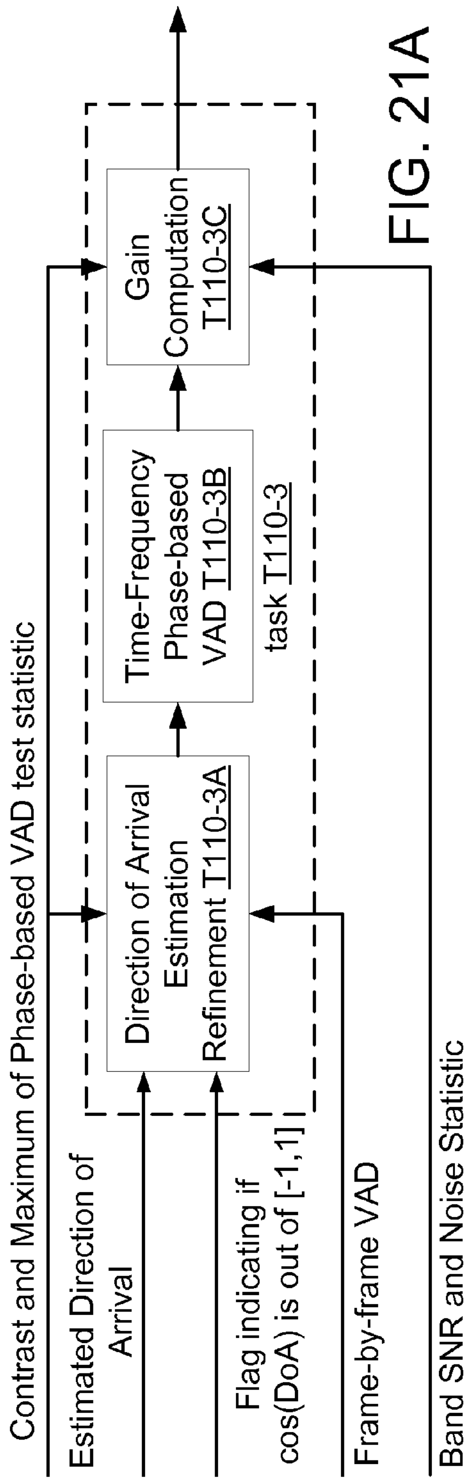
FIG. 21A shows a block diagram of a suppression scheme T110-3.
Figure 21B:
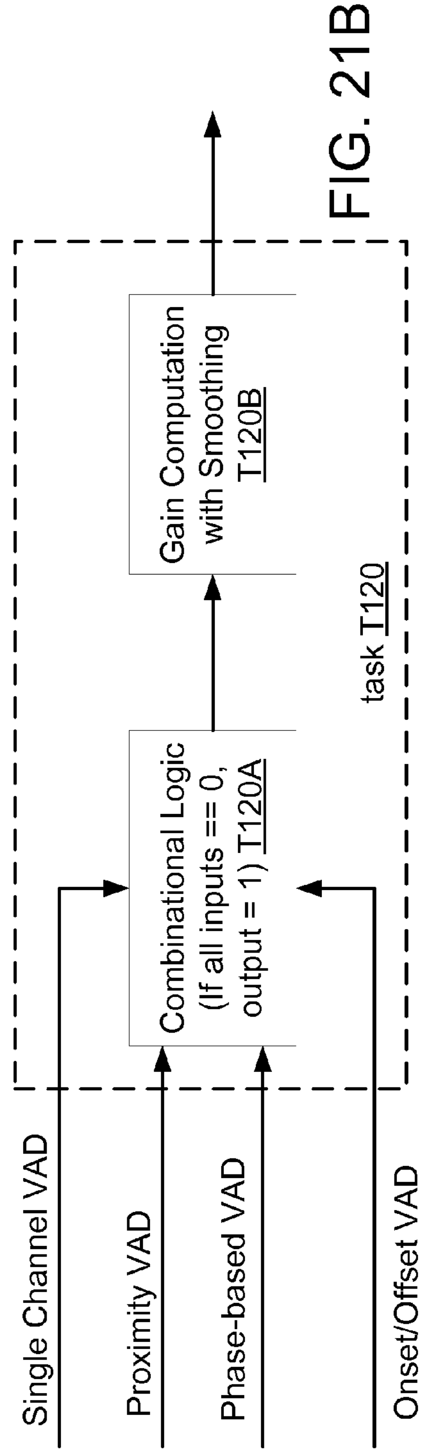
FIG. 21B shows a block diagram of module T120.

If the TF phase-based VAD indicates a lack of speech activity in that TF cell, it may be desirable to suppress the signal by a certain amount which is dependent on the contrast in the phase-based VAD test statistics, i.e., $s_{MAX}-s_{min}$. It may be desirable to limit the gain to have a value higher than a certain minimum, which may also be dependent on band SNR and/or the noise statistic as noted above. FIG. 21A shows a block diagram of such a suppression scheme T110-3.

Using all the information about proximity, direction of arrival, onset/offset, and SNR, a fairly good frame-by-frame VAD can be obtained. It may be risky to suppress the signal if the final combined VAD indicates there is no speech, because every VAD has false alarms and misses. But if the suppression is performed only if all the VADs including single-channel VAD, proximity VAD, phase-based VAD, and onset/offset VAD indicates there is no speech, it may be expected to be reasonably safe. A proposed module T120 as shown in the block diagram of FIG. 21B suppresses the final output signal when all the VADs indicate there is no speech, with appropriate smoothing (e.g., temporal smoothing of the gain factor).

It is known that different noise suppression techniques may have advantages for different types of noises. For example, spatial filtering is fairly good for competing talker noise, while the typical single-channel noise suppression is strong for stationary noise, especially white or pink noise. One size does not fit all, however. Tuning for competing talker noise, for example, is likely to result in modulated residual noise when the noise has a flat spectrum.

It may be desirable to control a residual noise suppression operation such that the control is based on noise characteristics. For example, it may be desirable to use different tuning parameters for residual noise suppression based on the noise statistics. One example of such a noise characteristic is a measure of the spectral flatness of the estimated noise. Such a measure may be used to control one or more tuning parameters, such as the aggressiveness of each noise suppression module in each frequency component (i.e., subband or bin).

It may be desirable to perform a method of reducing noise in a multichannel audio signal, wherein the method includes calculating a measure of spectral flatness of a noise component of the multichannel signal; and controlling a gain of at least one channel of the multichannel signal based on the calculated measure of spectral flatness.

There are a number of definitions for a spectral flatness measure. One popular measure proposed by Gray and Markel (A spectral-flatness measure for studying the autocorrelation method of linear prediction of speech signals, IEEE Trans. ASSP, 1974, vol. ASSP-22, no. 3, pp. 207-217) may be expressed as follows: $\Xi=\exp(-\mu)$, where $$\mu = \int_{-\pi}^{\pi} \{\exp[V(\theta)] - 1V(\theta)\} \frac{d\theta}{2\pi}$$

and $V(\theta)$ is the normalized log spectrum. Since $V(\theta)$ is the normalized log spectrum, this expression is equivalent to $$\mu = \int_{-\pi}^{\pi} \{-V(\theta)\} \frac{d\theta}{2\pi},$$

which is just the mean of the normalized log spectrum in the DFT domain and may be calculated as such. It may also be desirable to smooth the spectral flatness measure over time.

Figure 22:
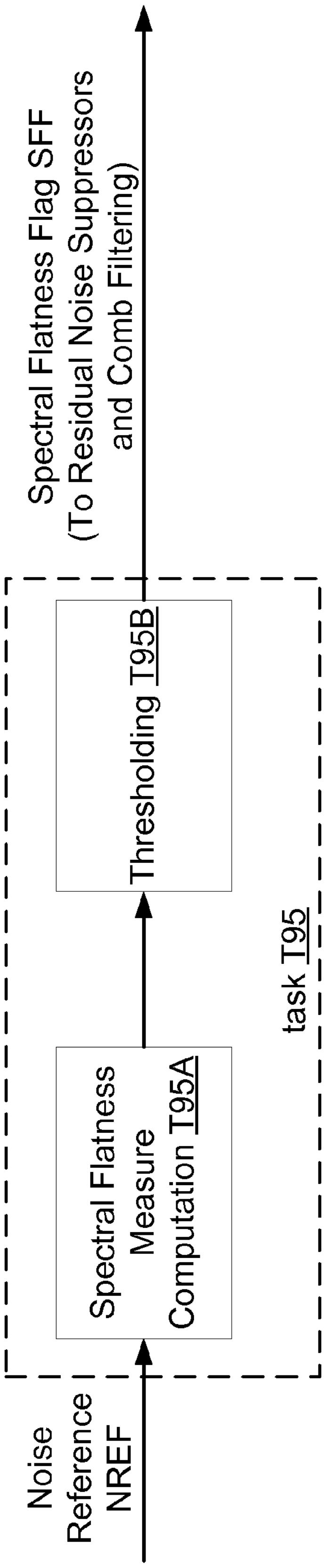
FIG. 22 shows a block diagram for task T95.

The smoothed spectral flatness measure may be used to control SNR-dependent aggressiveness function of the residual noise suppression and comb filtering. Other types of noise spectrum characteristics can be also used to control the noise suppression behavior. FIG. 22 shows a block diagram for a task T95 that is configured to indicate spectral flatness by thresholding the spectral flatness measure.

In general, the VAD strategies described herein (e.g., as in the various implementations of method M100) may be implemented using one or more portable audio sensing devices that each has an array R100 of two or more microphones configured to receive acoustic signals. Examples of a portable audio sensing device that may be constructed to include such an array and to be used with such a VAD strategy for audio recording and/or voice communications applications include a telephone handset (e.g., a cellular telephone handset); a wired or wireless headset (e.g., a Bluetooth headset); a handheld audio and/or video recorder; a personal media player configured to record audio and/or video content; a personal digital assistant (PDA) or other handheld computing device; and a notebook computer, laptop computer, netbook computer, tablet computer, or other portable computing device. Other examples of audio sensing devices that may be constructed to include instances of array R100 and to be used with such a VAD strategy include set-top boxes and audio- and/or video-conferencing devices.

Each microphone of array R100 may have a response that is omnidirectional, bidirectional, or unidirectional (e.g., cardioid). The various types of microphones that may be used in array R100 include (without limitation) piezoelectric microphones, dynamic microphones, and electret microphones. In a device for portable voice communications, such as a handset or headset, the center-to-center spacing between adjacent microphones of array R100 is typically in the range of from about 1.5 cm to about 4.5 cm, although a larger spacing (e.g., up to 10 or 15 cm) is also possible in a device such as a handset or smartphone, and even larger spacings (e.g., up to 20, 25 or 30 cm or more) are possible in a device such as a tablet computer. In a hearing aid, the center-to-center spacing between adjacent microphones of array R100 may be as little as about 4 or 5 mm. The microphones of array R100 may be arranged along a line or, alternatively, such that their centers lie at the vertices of a two-dimensional (e.g., triangular) or three-dimensional shape. In general, however, the microphones of array R100 may be disposed in any configuration deemed suitable for the particular application.

During the operation of a multi-microphone audio sensing device, array R100 produces a multichannel signal in which each channel is based on the response of a corresponding one of the microphones to the acoustic environment. One microphone may receive a particular sound more directly than another microphone, such that the corresponding channels differ from one another to provide collectively a more complete representation of the acoustic environment than can be captured using a single microphone.

Figure 23A:
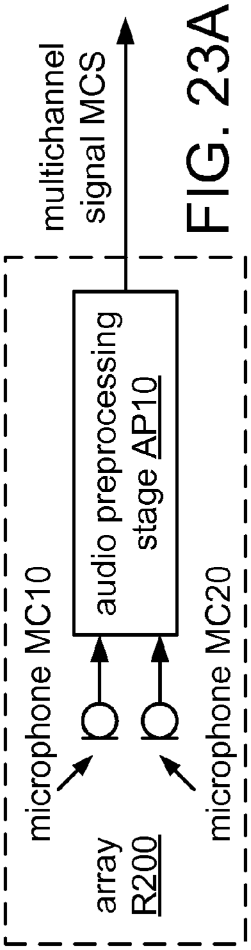
FIG. 23A shows a block diagram of an implementation R200 of array R100.

It may be desirable for array R100 to perform one or more processing operations on the signals produced by the microphones to produce the multichannel signal MCS that is processed by apparatus A100. FIG. 23A shows a block diagram of an implementation R200 of array R100 that includes an audio preprocessing stage AP10 configured to perform one or more such operations, which may include (without limitation) impedance matching, analog-to-digital conversion, gain control, and/or filtering in the analog and/or digital domains.

Figure 23B:
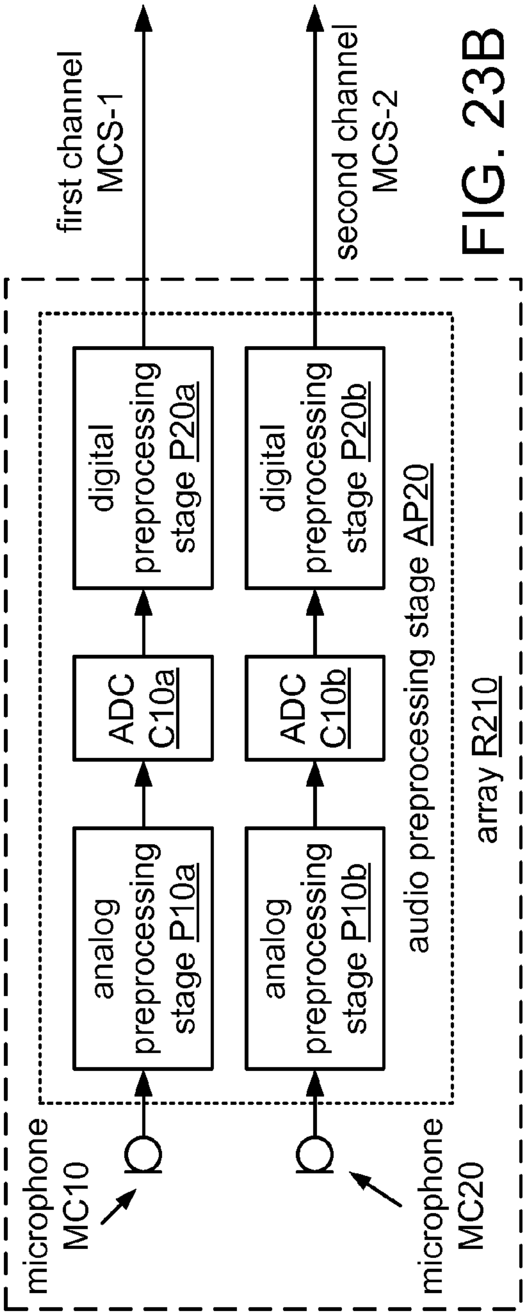
FIG. 23B shows a block diagram of an implementation R210 of array R200.

FIG. 23B shows a block diagram of an implementation R210 of array R200. Array R210 includes an implementation AP20 of audio preprocessing stage AP10 that includes analog preprocessing stages P10*a* and P10*b*. In one example, stages P10*a* and P10*b* are each configured to perform a highpass filtering operation (e.g., with a cutoff frequency of 50, 100, or 200 Hz) on the corresponding microphone signal.

It may be desirable for array R100 to produce the multichannel signal as a digital signal, that is to say, as a sequence of samples. Array R210, for example, includes analog-to-digital converters (ADCs) C10*a* and C10*b* that are each arranged to sample the corresponding analog channel. Typical sampling rates for acoustic applications include 8 kHz, 12 kHz, 16 kHz, and other frequencies in the range of from about 8 to about 16 kHz, although sampling rates as high as about 44.1, 48, and 192 kHz may also be used. In this particular example, array R210 also includes digital preprocessing stages P20*a* and P20*b* that are each configured to perform one or more preprocessing operations (e.g., echo cancellation, noise reduction, and/or spectral shaping) on the corresponding digitized channel to produce the corresponding channels MCS-1, MCS-2 of multichannel signal MCS. Additionally or in the alternative, digital preprocessing stages P20*a* and P20*b* may be implemented to perform a frequency transform (e.g., an FFT or MDCT operation) on the corresponding digitized channel to produce the corresponding channels MCS10-1, MCS10-2 of multichannel signal MCS10 in the corresponding frequency domain. Although FIGS. 23A and 23B show two-channel implementations, it will be understood that the same principles may be extended to an arbitrary number of microphones and corresponding channels of multichannel signal MCS10 (e.g., a three-, four-, or five-channel implementation of array R100 as described herein).

It is expressly noted that the microphones may be implemented more generally as transducers sensitive to radiations or emissions other than sound. In one such example, the microphone pair is implemented as a pair of ultrasonic transducers (e.g., transducers sensitive to acoustic frequencies greater than fifteen, twenty, twenty-five, thirty, forty, or fifty kilohertz or more).

Figure 24A:
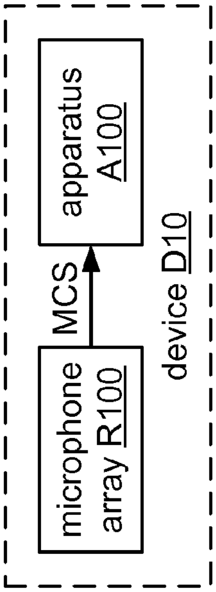
FIG. 24A shows a block diagram of a multimicrophone audio sensing device D10 according to a general configuration.

FIG. 24A shows a block diagram of a multimicrophone audio sensing device D10 according to a general configuration. Device D10 includes an instance of microphone array R100 and an instance of any of the implementations of apparatus A100 (or MF100) disclosed herein, and any of the audio sensing devices disclosed herein may be implemented as an instance of device D10. Device D10 also includes an apparatus A100 that is configured to process the multichannel audio signal MCS by performing an implementation of a method as disclosed herein. Apparatus A100 may be implemented as a combination of hardware (e.g., a processor) with software and/or with firmware.

Figure 24B:
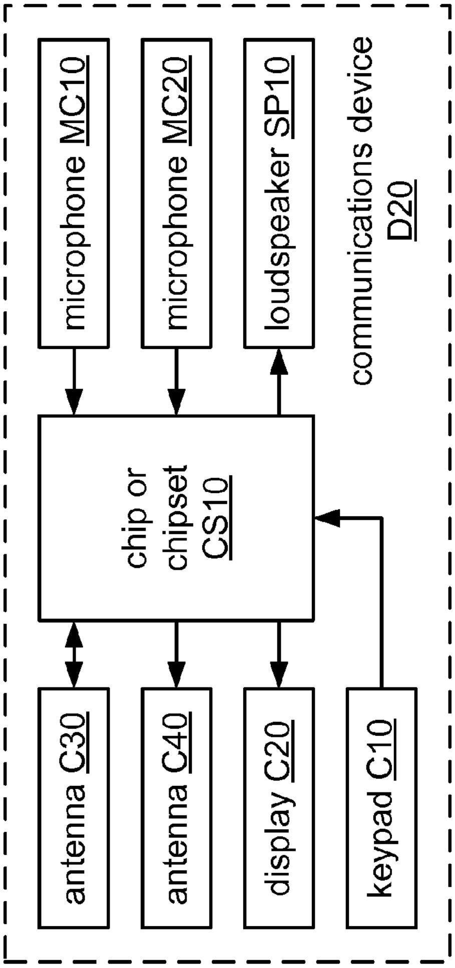
FIG. 24B shows a block diagram of a communications device D20 that is an implementation of device D10.

FIG. 24B shows a block diagram of a communications device D20 that is an implementation of device D10. Device D20 includes a chip or chipset CS10 (e.g., a mobile station modem (MSM) chipset) that includes an implementation of apparatus A100 (or MF100) as described herein. Chip/chipset CS10 may include one or more processors, which may be configured to execute all or part of the operations of apparatus A100 or MF100 (e.g., as instructions). Chip/chipset CS10 may also include processing elements of array R100 (e.g., elements of audio preprocessing stage AP10 as described below).

Chip/chipset CS10 includes a receiver which is configured to receive a radio-frequency (RF) communications signal (e.g., via antenna C40) and to decode and reproduce (e.g., via loudspeaker SP10) an audio signal encoded within the RF signal. Chip/chipset CS10 also includes a transmitter which is configured to encode an audio signal that is based on an output signal produced by apparatus A100 and to transmit an RF communications signal (e.g., via antenna C40) that describes the encoded audio signal. For example, one or more processors of chip/chipset CS10 may be configured to perform a noise reduction operation as described above on one or more channels of the multichannel signal such that the encoded audio signal is based on the noise-reduced signal. In this example, device D20 also includes a keypad C10 and display C20 to support user control and interaction.

Figure 25:
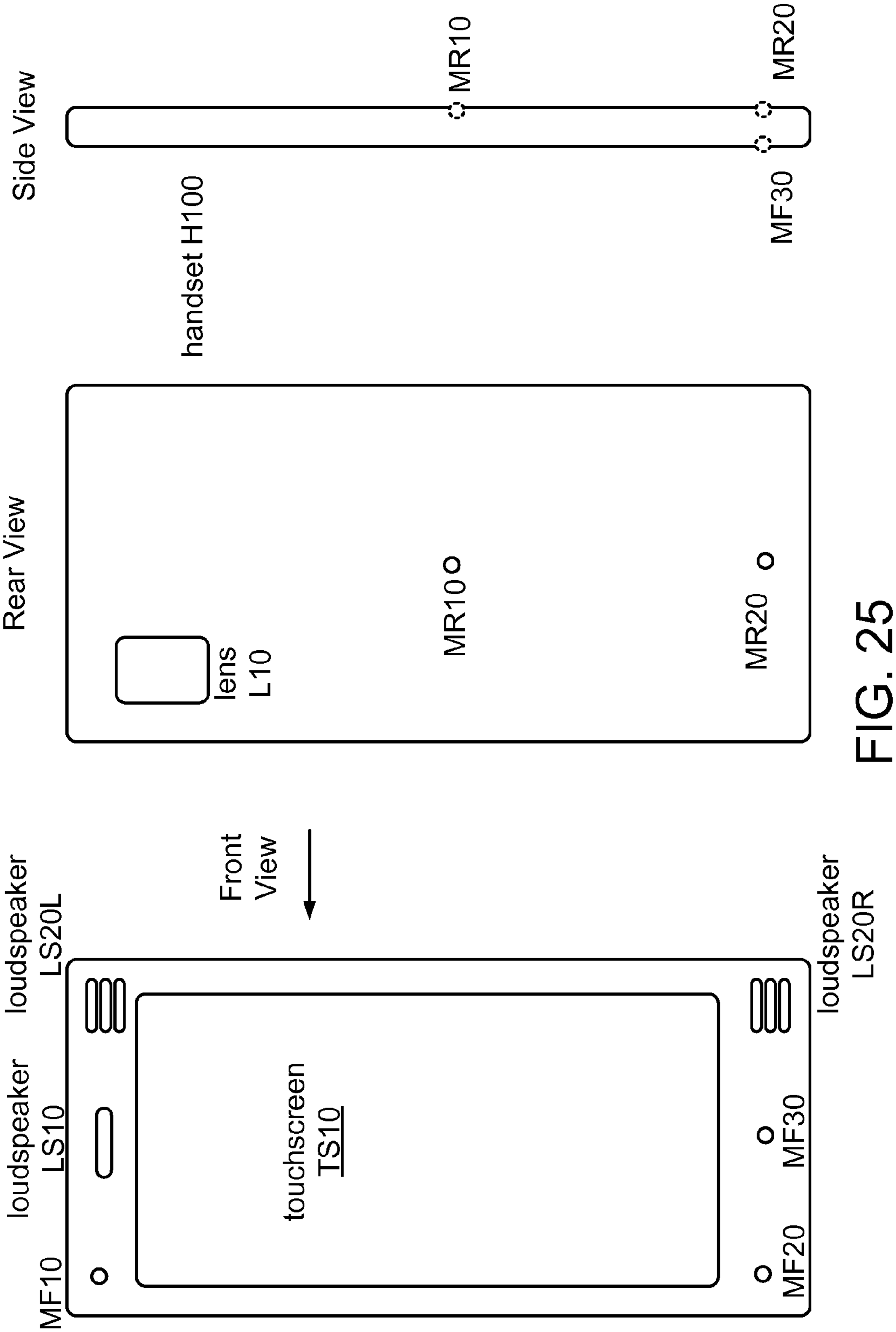
FIG. 25 shows front, rear, and side views of a handset H100.
Figure 26:
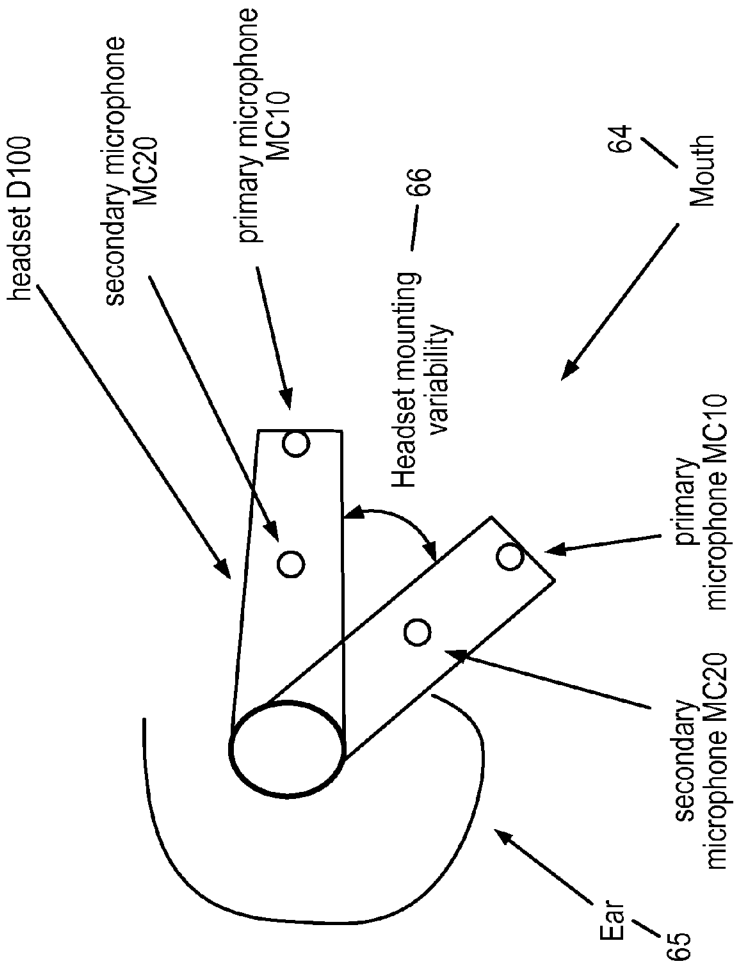
FIG. 26 illustrates mounting variability in a headset D100.

FIG. 25 shows front, rear, and side views of a handset H100 (e.g., a smartphone) that may be implemented as an instance of device D20. Handset H100 includes three microphones MF10, MF20, and MF30 arranged on the front face; and two microphone MR10 and MR20 and a camera lens L10 arranged on the rear face. A loudspeaker LS10 is arranged in the top center of the front face near microphone MF10, and two other loudspeakers LS20L, LS20R are also provided (e.g., for speakerphone applications). A maximum distance between the microphones of such a handset is typically about ten or twelve centimeters. It is expressly disclosed that applicability of systems, methods, and apparatus disclosed herein is not limited to the particular examples noted herein. For example, such techniques may also be used to obtain VAD performance in a headset D100 that is robust to mounting variability as shown in FIG. 26.

The methods and apparatus disclosed herein may be applied generally in any transceiving and/or audio sensing application, including mobile or otherwise portable instances of such applications and/or sensing of signal components from far-field sources. For example, the range of configurations disclosed herein includes communications devices that reside in a wireless telephony communication system configured to employ a code-division multiple-access (CDMA) over-the-air interface. Nevertheless, it would be understood by those skilled in the art that a method and apparatus having features as described herein may reside in any of the various communication systems employing a wide range of technologies known to those of skill in the art, such as systems employing Voice over IP (VoIP) over wired and/or wireless (e.g., CDMA, TDMA, FDMA, and/or TD-SCDMA) transmission channels.

It is expressly contemplated and hereby disclosed that communications devices disclosed herein may be adapted for use in networks that are packet-switched (for example, wired and/or wireless networks arranged to carry audio transmissions according to protocols such as VoIP) and/or circuit-switched. It is also expressly contemplated and hereby disclosed that communications devices disclosed herein may be adapted for use in narrowband coding systems (e.g., systems that encode an audio frequency range of about four or five kilohertz) and/or for use in wideband coding systems (e.g., systems that encode audio frequencies greater than five kilohertz), including whole-band wideband coding systems and split-band wideband coding systems.

The foregoing presentation of the described configurations is provided to enable any person skilled in the art to make or use the methods and other structures disclosed herein. The flowcharts, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

Important design requirements for implementation of a configuration as disclosed herein may include minimizing processing delay and/or computational complexity (typically measured in millions of instructions per second or MIPS), especially for computation-intensive applications, such as playback of compressed audio or audiovisual information (e.g., a file or stream encoded according to a compression format, such as one of the examples identified herein) or applications for wideband communications (e.g., voice communications at sampling rates higher than eight kilohertz, such as 12, 16, 44.1, 48, or 192 kHz).

Goals of a multi-microphone processing system may include achieving ten to twelve dB in overall noise reduction, preserving voice level and color during movement of a desired speaker, obtaining a perception that the noise has been moved into the background instead of an aggressive noise removal, dereverberation of speech, and/or enabling the option of post-processing for more aggressive noise reduction.

An apparatus as disclosed herein (e.g., apparatus A100 and MF100) may be implemented in any combination of hardware with software, and/or with firmware, that is deemed suitable for the intended application. For example, the elements of such an apparatus may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of the elements of the apparatus may be implemented within the same array or arrays. Such an array or arrays may be implemented within one or more chips (for example, within a chipset including two or more chips).

One or more elements of the various implementations of the apparatus disclosed herein may also be implemented in whole or in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs, and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a voice activity detection procedure as described herein, such as a task relating to another operation of a device or system in which the processor is embedded (e.g., an audio sensing device). It is also possible for part of a method as disclosed herein to be performed by a processor of the audio sensing device and for another part of the method to be performed under the control of one or more other processors.

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general-purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the various methods disclosed herein (e.g., method M100 and other methods disclosed by way of description of the operation of the various apparatus described herein) may be performed by an array of logic elements such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor-readable storage medium or transmitted by a computer data signal embodied in a carrier wave over a transmission medium or communication link.

The implementations of methods, schemes, and techniques disclosed herein may also be tangibly embodied (for example, in one or more computer-readable media as listed herein) as one or more sets of instructions readable and/or executable by a machine including an array of logic elements (e.g., a processor, microprocessor, microcontroller, or other finite state machine). The term "computer-readable medium" may include any medium that can store or transfer information, including volatile, nonvolatile, removable and non-removable media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk, a fiber optic medium, a radio frequency (RF) link, or any other medium which can be used to store the desired information and which can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed by a portable communications device such as a handset, headset, or portable digital assistant (PDA), and that the various apparatus described herein may be included within such a device. A typical real-time (e.g., online) application is a telephone conversation conducted using such a mobile device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

An acoustic signal processing apparatus as described herein (e.g., apparatus A100 or MF100) may be incorporated into an electronic device that accepts speech input in order to control certain operations, or may otherwise benefit from separation of desired noises from background noises, such as communications devices. Many applications may benefit from enhancing or separating clear desired sound from background sounds originating from multiple directions. Such applications may include human-machine interfaces in electronic or computing devices which incorporate capabilities such as voice recognition and detection, speech enhancement and separation, voice-activated control, and the like. It may be desirable to implement such an acoustic signal processing apparatus to be suitable in devices that only provide limited processing capabilities.

The elements of the various implementations of the modules, elements, and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs, and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times).

What is claimed is:

1. A method of processing an audio signal, said method comprising:

based on information from a first plurality of frames of the audio signal, calculating a series of values of a first voice activity measure;

based on information from a second plurality of frames of the audio signal, calculating a series of values of a second voice activity measure that is different from the first voice activity measure;

based on the series of values of the first voice activity measure, calculating a boundary value of the first voice activity measure; and based on the series of values of the first voice activity measure, the series of values of the second voice activity measure, and the calculated boundary value of the first voice activity measure, producing a series of combined voice activity decisions.

2. The method according to claim 1, wherein each value of the series of values of the first voice activity measure is based on a relation between channels of the audio signal.

3. The method according to claim 1, wherein each value of the series of values of the first voice activity measure corresponds to a different frame of the first plurality of frames.

4. The method according to claim 3, wherein said calculating a series of values of the first voice activity measure comprises, for each of said series of values and for each of a plurality of different frequency components of the corresponding frame, calculating a difference between (A) a phase of the frequency component in a first channel of the frame and (B) a phase of the frequency component in a second channel of the frame.

5. The method according to claim 1, wherein each value of the series of values of the second voice activity measure corresponds to a different frame of the second plurality of frames, and wherein said calculating a series of values of the second voice activity measure comprises calculating, for each of said series of values, a time derivative of energy for each of a plurality of different frequency components of the corresponding frame, and wherein each of said series of values of the second voice activity measure is based on said plurality of calculated time derivatives of energy of the corresponding frame.

6. The method according to claim 1, each of said series of values of the second voice activity measure is based on a relation between a level of a first channel of the audio signal and a level of a second channel of the audio signal.

7. The method according to claim 1, wherein each value of the series of values of the second voice activity measure corresponds to a different frame of the second plurality of frames, and wherein said calculating a series of values of the second voice activity measure comprises calculating, for each of said series of values, (A) a level of a first channel of the corresponding frame in a range of frequencies below one kilohertz and (B) a level of a second channel of the corresponding frame in said range of frequencies below one kilohertz, and wherein each of said series of values of the second voice activity measure is based on a relation between (A) said calculated level of the first channel of the corresponding frame and (B) said calculated level of the second channel of the corresponding frame.

8. The method according to claim 1, wherein said calculating the boundary value of the first voice activity measure comprises calculating a minimum value of the first voice activity measure.

9. The method according to claim 8, wherein said calculating a minimum value comprises:

smoothing the series of values of the first voice activity measure; and determining a minimum among the smoothed values.

10. The method according to claim 1, wherein said calculating the boundary value of the first voice activity measure comprises calculating a maximum value of the first voice activity measure.

11. The method according to claim 1, wherein said producing the series of combined voice activity decisions includes comparing each of a first set of values to a first threshold to obtain a series of first voice activity decisions, wherein the first set of values is based on the series of values of the first activity measure, and wherein at least one of (A) the first set of values and (B) the first threshold is based on the calculated boundary value of the first voice activity measure.

12. The method according to claim 11, wherein said producing the series of combined voice activity decisions includes normalizing the series of values of the first voice activity measure, based on the calculated boundary value of the first voice activity measure, to produce the first set of values.

13. The method according to claim 11, wherein said producing the series of combined voice activity decisions includes remapping the series of values of the first voice activity measure to a range that is based on the calculated boundary value of the first voice activity measure to produce the first set of values.

14. The method according to claim 11, wherein said first threshold is based on the calculated boundary value of the first voice activity measure.

15. The method according to claim 11, wherein said first threshold is based on information from the series of values of the second voice activity measure.

16. The method according to claim 1, wherein said method comprises, based on the series of values of the second voice activity measure, calculating a boundary value of the second voice activity measure, and wherein said producing the series of combined voice activity decisions is based on the calculated boundary value of the second voice activity measure.

17. The method according to claim 1, wherein each value of the series of values of the first voice activity measure corresponds to a different frame of the first plurality of frames and is based on a first relation between channels of the corresponding frame, and wherein each value of the series of values of the second voice activity measure corresponds to a different frame of the second plurality of frames and is based on a second relation between channels of the corresponding frame that is different than the first relation.

18. An apparatus for processing an audio signal, said apparatus comprising:

means for calculating a series of values of a first voice activity measure, based on information from a first plurality of frames of the audio signal;

means for calculating a series of values of a second voice activity measure that is different from the first voice activity measure, based on information from a second plurality of frames of the audio signal;

means for calculating a boundary value of the first voice activity measure, based on the series of values of the first voice activity measure; and means for producing a series of combined voice activity decisions, based on the series of values of the first voice activity measure, the series of values of the second voice activity measure, and the calculated boundary value of the first voice activity measure.

19. The apparatus according to claim 18, wherein each value of the series of values of the first voice activity measure is based on a relation between channels of the audio signal.

20. The apparatus according to claim 18, wherein each value of the series of values of the first voice activity measure corresponds to a different frame of the first plurality of frames.

21. The apparatus according to claim 20, wherein said means for calculating a series of values of the first voice activity measure comprises means for calculating, for each of said series of values and for each of a plurality of different frequency components of the corresponding frame, a difference between (A) a phase of the frequency component in a first channel of the frame and (B) a phase of the frequency component in a second channel of the frame.

22. The apparatus according to claim 18, wherein each value of the series of values of the second voice activity measure corresponds to a different frame of the second plurality of frames, and wherein said means for calculating a series of values of the second voice activity measure comprises means for calculating, for each of said series of values, a time derivative of energy for each of a plurality of different frequency components of the corresponding frame, and wherein each of said series of values of the second voice activity measure is based on said plurality of calculated time derivatives of energy of the corresponding frame.

23. The apparatus according to claim 18, each of said series of values of the second voice activity measure is based on a relation between a level of a first channel of the audio signal and a level of a second channel of the audio signal.

24. The apparatus according to claim 18, wherein each value of the series of values of the second voice activity measure corresponds to a different frame of the second plurality of frames, and wherein said means for calculating a series of values of the second voice activity measure comprises means for calculating, for each of said series of values, (A) a level of a first channel of the corresponding frame in a range of frequencies below one kilohertz and (B) a level of a second channel of the corresponding frame in said range of frequencies below one kilohertz, and wherein each of said series of values of the second voice activity measure is based on a relation between (A) said calculated level of the first channel of the corresponding frame and (B) said calculated level of the second channel of the corresponding frame.

25. The apparatus according to claim 18, wherein said means for calculating the boundary value of the first voice activity measure comprises means for calculating a minimum value of the first voice activity measure.

26. The apparatus according to claim 25, wherein said means for calculating a minimum value comprises:

means for smoothing the series of values of the first voice activity measure; and means for determining a minimum among the smoothed values.

27. The apparatus according to claim 18, wherein said means for calculating the boundary value of the first voice activity measure comprises means for calculating a maximum value of the first voice activity measure.

28. The apparatus according to claim 18, wherein said means for producing the series of combined voice activity decisions includes means for comparing each of a first set of values to a first threshold to obtain a series of first voice activity decisions, wherein the first set of values is based on the series of values of the first activity measure, and wherein at least one of (A) the first set of values and (B) the first threshold is based on the calculated boundary value of the first voice activity measure.

29. The apparatus according to claim 28, wherein said means for producing the series of combined voice activity decisions includes means for normalizing the series of values of the first voice activity measure, based on the calculated boundary value of the first voice activity measure, to produce the first set of values.

30. The apparatus according to claim 28, wherein said means for producing the series of combined voice activity decisions includes means for remapping the series of values of the first voice activity measure to a range that is based on the calculated boundary value of the first voice activity measure to produce the first set of values.

31. The apparatus according to claim 28, wherein said first threshold is based on the calculated boundary value of the first voice activity measure.

32. The apparatus according to claim 28, wherein said first threshold is based on information from the series of values of the second voice activity measure.

33. The apparatus according to claim 18, wherein said apparatus comprises means for calculating, based on the series of values of the second voice activity measure, a boundary value of the second voice activity measure, and wherein said producing the series of combined voice activity decisions is based on the calculated boundary value of the second voice activity measure.

34. The apparatus according to claim 18, wherein each value of the series of values of the first voice activity measure corresponds to a different frame of the first plurality of frames and is based on a first relation between channels of the corresponding frame, and wherein each value of the series of values of the second voice activity measure corresponds to a different frame of the second plurality of frames and is based on a second relation between channels of the corresponding frame that is different than the first relation.

35. An apparatus for processing an audio signal, said apparatus comprising:

a first calculator configured to calculate a series of values of a first voice activity measure, based on information from a first plurality of frames of the audio signal;

a second calculator configured to calculate a series of values of a second voice activity measure that is different from the first voice activity measure, based on information from a second plurality of frames of the audio signal;

a boundary value calculator configured to calculate a boundary value of the first voice activity measure, based on the series of values of the first voice activity measure; and a decision module configured to produce a series of combined voice activity decisions, based on the series of values of the first voice activity measure, the series of values of the second voice activity measure, and the calculated boundary value of the first voice activity measure.

36. The apparatus according to claim 35, wherein each value of the series of values of the first voice activity measure is based on a relation between channels of the audio signal.

37. The apparatus according to claim 35, wherein each value of the series of values of the first voice activity measure corresponds to a different frame of the first plurality of frames.

38. The apparatus according to claim 37, wherein said first calculator is configured to calculate, for each of said series of values and for each of a plurality of different frequency components of the corresponding frame, a difference between (A) a phase of the frequency component in a first channel of the frame and (B) a phase of the frequency component in a second channel of the frame.

39. The apparatus according to claim 35, wherein each value of the series of values of the second voice activity measure corresponds to a different frame of the second plurality of frames, and wherein said second calculator is configured to calculate, for each of said series of values, a time derivative of energy for each of a plurality of different frequency components of the corresponding frame, and wherein each of said series of values of the second voice activity measure is based on said plurality of calculated time derivatives of energy of the corresponding frame.

40. The apparatus according to claim 35, each of said series of values of the second voice activity measure is based on a relation between a level of a first channel of the audio signal and a level of a second channel of the audio signal.

41. The apparatus according to claim 35, wherein each value of the series of values of the second voice activity measure corresponds to a different frame of the second plurality of frames, and wherein said second calculator is configured to calculate, for each of said series of values, (A) a level of a first channel of the corresponding frame in a range of frequencies below one kilohertz and (B) a level of a second channel of the corresponding frame in said range of frequencies below one kilohertz, and wherein each of said series of values of the second voice activity measure is based on a relation between (A) said calculated level of the first channel of the corresponding frame and (B) said calculated level of the second channel of the corresponding frame.

42. The apparatus according to claim 35, wherein said boundary value calculator is configured to calculate a minimum value of the first voice activity measure.

43. The apparatus according to claim 42, wherein said boundary value calculator is configured to smooth the series of values of the first voice activity measure and to determine a minimum among the smoothed values.

44. The apparatus according to claim 35, wherein said boundary value calculator is configured to calculate a maximum value of the first voice activity measure.

45. The apparatus according to claim 35, wherein said decision module is configured to compare each of a first set of values to a first threshold to obtain a series of first voice activity decisions, wherein the first set of values is based on the series of values of the first activity measure, and wherein at least one of (A) the first set of values and (B) the first threshold is based on the calculated boundary value of the first voice activity measure.

46. The apparatus according to claim 45, wherein said decision module is configured to normalize the series of values of the first voice activity measure, based on the calculated boundary value of the first voice activity measure, to produce the first set of values.

47. The apparatus according to claim 45, wherein said decision module is configured to remap the series of values of the first voice activity measure to a range that is based on the calculated boundary value of the first voice activity measure to produce the first set of values.

48. The apparatus according to claim 45, wherein said first threshold is based on the calculated boundary value of the first voice activity measure.

49. The apparatus according to claim 45, wherein said first threshold is based on information from the series of values of the second voice activity measure.

50. A non-transitory machine-readable storage medium comprising tangible features that when read by a machine cause the machine to:

calculate a series of values of a first voice activity measure, based on information from a first plurality of frames of the audio signal;

calculate a series of values of a second voice activity measure that is different from the first voice activity measure, based on information from a second plurality of frames of the audio signal;

calculate a boundary value of the first voice activity measure, based on the series of values of the first voice activity measure; and produce a series of combined voice activity decisions, based on the series of values of the first voice activity measure, the series of values of the second voice activity measure, and the calculated boundary value of the first voice activity measure.

* * * * *